US012527831B2

United States Patent
Koganov et al.

(10) Patent No.: US 12,527,831 B2
(45) Date of Patent: Jan. 20, 2026

(54) SKIN CARE COMPOSITIONS COMPRISING SYNERGISTIC BLEND OF SACRED LOTUS AND TEA PLANT OR SACRED LOTUS AND GERMAN CHAMOMILE AND COSMETIC APPLICATIONS THEREOF

(71) Applicants: ISP INVESTMENTS LLC, Wilmington, DE (US); THE BURT'S BEES PRODUCTS COMPANY, Oakland, CA (US)

(72) Inventors: Michael Koganov, White Plains, NY (US); Olga Dueva-Koganov, White Plains, NY (US); Artyom Duev, White Plains, NY (US); Li Zhang, Princeton, NJ (US); Paul Recht, Pleasantville, NY (US); Steven Micceri, Milford, CT (US); Abena Agyeiwaa Antwi, Apex, NC (US); Hemali Gunt, Morrisville, NC (US)

(73) Assignee: ISP INVESTMENTS LLC, Wilmington, DE (US)

( * ) Notice: Subject to any disclaimer, the term of this patent is extended or adjusted under 35 U.S.C. 154(b) by 714 days.

(21) Appl. No.: 17/627,524

(22) PCT Filed: Jul. 14, 2020

(86) PCT No.: PCT/US2020/041953
§ 371 (c)(1),
(2) Date: Jan. 14, 2022

(87) PCT Pub. No.: WO2021/011548
PCT Pub. Date: Jan. 21, 2021

(65) Prior Publication Data
US 2022/0347082 A1 Nov. 3, 2022

Related U.S. Application Data

(60) Provisional application No. 62/874,110, filed on Jul. 15, 2019.

(51) Int. Cl.
| A61K 36/62 | (2006.01) |
| A61K 8/34 | (2006.01) |
| A61K 8/37 | (2006.01) |
| A61K 36/82 | (2006.01) |
| A61Q 17/04 | (2006.01) |
| A61Q 19/08 | (2006.01) |

(52) U.S. Cl.
CPC .............. *A61K 36/62* (2013.01); *A61K 8/342* (2013.01); *A61K 8/375* (2013.01); *A61K 36/82* (2013.01); *A61Q 17/04* (2013.01); *A61Q 19/08* (2013.01); *A61K 2800/522* (2013.01); *A61K 2800/75* (2013.01); *A61K 2800/782* (2013.01)

(58) Field of Classification Search
None
See application file for complete search history.

(56) References Cited

U.S. PATENT DOCUMENTS

| 8,043,635 B2 | 10/2011 | Koganov | |
| 8,277,852 B2 | 10/2012 | Koganov et al. | |
| 8,318,220 B2 | 11/2012 | Koganov | |
| 2015/0216785 A1 | 8/2015 | Antwi | |
| 2015/0258012 A1 | 9/2015 | Koganov | |
| 2016/0000851 A1* | 1/2016 | Koganov | ............... A61K 36/82 510/447 |

FOREIGN PATENT DOCUMENTS

| CN | 104352420 A | 2/2015 |
| KR | 1723526 B1 | 4/2017 |
| TW | 201100113 A | 1/2011 |
| TW | 201100113 A1 | 1/2011 |
| WO | WO2017147578 A1 | 8/2017 |

OTHER PUBLICATIONS

Mahmood, T. & Akhtar, N., Combined Topical Application of Lotus and Green Tea Improves Facial Skin Surface Parameters, Rejuvenation Research, vol. 16, No. 2, 2013, 91-97 (Year: 2013).*
International Search Report of PCT Application No. PCT/US2020/041953 published on Jan. 21, 2021.

* cited by examiner

*Primary Examiner* — H. Sarah Park
(74) *Attorney, Agent, or Firm* — Nathalie Tietcheu; Aseem Mehta (57) ABSTRACT

The present invention is related to a skin care composition comprising (1) a physiologically acceptable medium and (2) a synergistic composition consisting of: a blend of a *Nelumbo nucifera* (Sacred Lotus) serum fraction and a *Camellia sinensis* (Tea) serum fraction in a respective weight ratio of 75:25; or a blend of a *Nelumbo nucifera* (Sacred Lotus) serum fraction and a *Chamomilla recutita* (German chamomile) serum fraction in a respective weight ratio of 75:25. The invention also relates to a method for improving skin appearance associated with skin aging comprising applying compositions thereof.

13 Claims, 4 Drawing Sheets

SKIN CARE COMPOSITIONS COMPRISING SYNERGISTIC BLEND OF SACRED LOTUS AND TEA PLANT OR SACRED LOTUS AND GERMAN CHAMOMILE AND COSMETIC APPLICATIONS THEREOF

FIELD OF THE INVENTION

The present invention relates to the field of cosmetic or skin care compositions and more specifically to the field of skin care composition. It relates to the cosmetic use of a synergistic blend of a *Nelumbo nucifera* Gaertn. (Sacred Lotus, NN) serum fraction and a *Camellia sinensis* leaves (Tea Plant, CS) or a synergistic blend of a *Nelumbo nucifera* Gaertn. (Sacred Lotus, NN) serum fraction and a *Chamomilla recutita* (German Chamomile (*Matricaria*) Flower, CR-F) serum fraction for improving the appearance of the skin associated with skin aging.

BACKGROUND

Over the past several decades, the cosmetic industry has embraced the use of plants and plant products in a variety of cosmetic formulations and products. Although this trend is expected to continue, there is a need for more refined and higher quality botanical ingredients that consistently exhibit characteristics that are appealing to the cosmetic industry and consumers. Some of these appealing bioactive characteristics include anti-inflammatory and antioxidant activity.

Skin aging is a multifactorial process driven by both intrinsic (chronological aging) and extrinsic (environmental) factors. Environmental factors include ultraviolet (UV) and sunlight exposure, environmental toxins, pollutants, and smoking, as well as irritant molecules like surfactants. It is well known in the art that the ability of the stratum corneum to cyclically generate new layers of skin diminishes with age so that the stratum corneum turnover rate is substantially reduced in aged skin, with the cornified layer becoming gradually thinner. This results in a reduction in the functioning capacity of the barrier so that harmful stimuli penetrate the stratum corneum more easily, leading to UV-damage, for example, of the underlying dermal layers, degradation of collagen and elastin, and eventually manifests in appearance as wrinkling and skin atrophy. Thinning of the stratum corneum by the sum of intrinsic and extrinsic aging factors increases the visible appearance of fine lines and wrinkles. Recovery capacity of the barrier to environmental insult is also substantially reduced with age.

Thus, the skin's barrier function is key to the skin's ability to regenerate and protect itself from the appearance of aging skin.

Certain bioactive compositions (i.e. serum fractions) produced by process described, for example, in U.S. Pat. Nos. 7,473,435; 8,043,635; 8,277,852, 8,318,220, international patent application WO2017147578, U.S. patent application Ser. No. 14/440,831 (publication number US 2015-0258012) have compositions notably different from conventional solvent extracted botanical extracts. Certain fractions, when used as cosmetic ingredients, have potent anti-inflammatory, anti-oxidant and photo-stabilization activities that may influence multiple biological pathways responsible for skin aging, while also minimizing deterioration of formulation stability, color and odor, which would make them especially suitable for topical applications.

Accordingly, it would be desirable to provide skin care compositions and methods of treatment that can improve both the skin's barrier function and the appearance of aging skin. The solution to the technical problem addressed lies in the cosmetic use of the synergistic blend of a *Nelumbo nucifera* Gaertn. (Sacred Lotus, NN) serum fraction and a *Camellia sinensis* leaves (Tea Plant, CS) serum fraction or a synergistic blend of a *Nelumbo nucifera* Gaertn. (Sacred Lotus, NN) serum fraction and a *Chamomilla recutita* (German Chamomile (*Matricaria*) Flower, CR-F) serum fraction. The invention and the resulting advantages will be better understood upon reading the description.

SUMMARY

Disclosed herein is a skin care composition comprising (1) a physiologically acceptable medium and (2) A synergistic composition consisting of a blend of a *Nelumbo nucifera* Gaertn. (Sacred Lotus, NN) serum fraction and a *Camellia sinensis* leaves (Tea Plant, CS) serum fraction in a respective weight ratio of 75:25; or a blend of a *Nelumbo nucifera* Gaertn. (Sacred Lotus, NN) serum fraction and a *Chamomilla recutita* (German chamomile (*Matricaria*) Flower, CR-F) serum fraction in a respective weight ratio of 75:25

In another aspect the present disclosure relates to a method of cosmetic care comprising the step of topically applying the skin care composition of the invention, to a skin surface having at least one sign of aging, to improve the appearance of the skin associated with skin aging.

In another aspect the present disclosure relates to a method for improving skin appearance by improving skin hydration, skin barrier function, skin laxity, appearance of skin wrinkles, skin pigmentation, and/or skin tone.

In another aspect the present disclosure relates to a method for mitigating adverse effects caused by full spectrum sunlight, UV radiation and surfactants.

In another aspect the present disclosure relates to a method for improving skin appearance associated with anti-inflammation and antioxidant defense.

In another aspect the present disclosure relates to a method for inhibiting IL-1α release induced by SDS and to inhibit IL-8 release induced by full sun spectrum irradiation.

The present invention also relates to the use of these skin care compositions in various formulations intended for topical skin applications.

The advantage of the serum fractions and methods of the present disclosure over existing skin aging products and methods is that the serum fractions are derived from living plants using a fractionation process not found in nature. Further, as described herein, the serum fractions obtained from living plants are water-soluble/miscible and do not require the use of exogenous solvents. These and other objects, features, and advantages of this invention will become apparent from the following detailed description of the various aspects of the invention taken in conjunction with the accompanying drawings.

BRIEF DESCRIPTION OF THE DRAWINGS

For the purpose of illustrating aspects of the present invention, there are depicted in the drawing's certain embodiments of the invention. However, the invention is not limited to the precise arrangements and instrumentalities of the embodiments depicted in the drawings. Further, if provided, like reference numerals contained in the drawings are meant to identify similar or identical elements.

Further embodiments of the present invention can be understood with the appended figures.

DETAILED DESCRIPTION

Detailed embodiments of the present invention are disclosed herein; however, it is to be understood that the disclosed embodiments are merely illustrative of the invention that may be embodied in various forms. Therefore, specific structural and functional details disclosed herein are not to be interpreted as limiting, but merely as a representative basis for teaching one skilled in the art to variously employ the present invention.

Whenever a term is identified by reference to a range, the range will be understood to explicitly disclose every element thereof. As a non-limiting example, a range of 1-10% will be understood to include 1%, 2%, 3%, 4%, 5%, 6%, 7%, 8%, 9%, and 10%, and all values between 1 and 10%.

Where two or more substituents are referred to as being "selected from" a group of enumerated alternatives, it is meant that each substituent can be any element of that group, independent of the identity of the other substituents.

As used herein, "% refers to % by weight, that is the weight percent of a component in relation to the total weight of the skin care composition (i.e., including any carriers, vehicles, solvents, fillers, or other components added before application to the skin) unless otherwise provided.

All terms used herein are intended to have their ordinary meaning unless otherwise provided. For the purposes of describing and claiming the present invention, the following terms are defined:

The compositions described and used in the present disclosure can comprise, consist essentially of, or consist of, the essential components as well as optional ingredients described herein. As used herein, "consisting essentially of" means that the composition or component may include additional ingredients, but only if the additional ingredients do not materially alter the basic and novel characteristics of the claimed compositions or methods.

"Apply" or "Application" as used in reference to a skin care composition means to apply or spread the compositions of the present invention onto a human skin surface such as the epidermis.

"Physiologically acceptable" as used herein means, in the skin care compositions of the invention, a medium suitable for use in contact with human skin tissue without undue toxicity, incompatibility, instability, allergic response and the like, capable of being applied to the skin, integuments or lips of the face or the body of mammals or human beings.

"Skin pigmentation" as used herein means the coloring of the skin, due to the deposition and the nature of melanin in the basal layer of epidermis. In aging skin hyperpigmented spots may appear wherein the pigmentation is due to localized and chronic overproduction of melanin caused by intrinsic or extrinsic aging factors.

"Facial skin surface" as used herein refers to one or more of forehead, periorbital, cheek, perioral, chin, and nose skin surfaces.

"Skin tone" as used herein refers to the overall pigmentation of the skin caused by the systemic, rather than transient, synthesis of melanin. Skin tone is typically characterized over a larger area of the skin.

"Exogenous solvent" as used herein, means any solvent that is not inherently present in the plant material, but is placed in contact with the plant material for the purpose of separating (e.g., extracting) compounds from the plant material.

Figure 1:
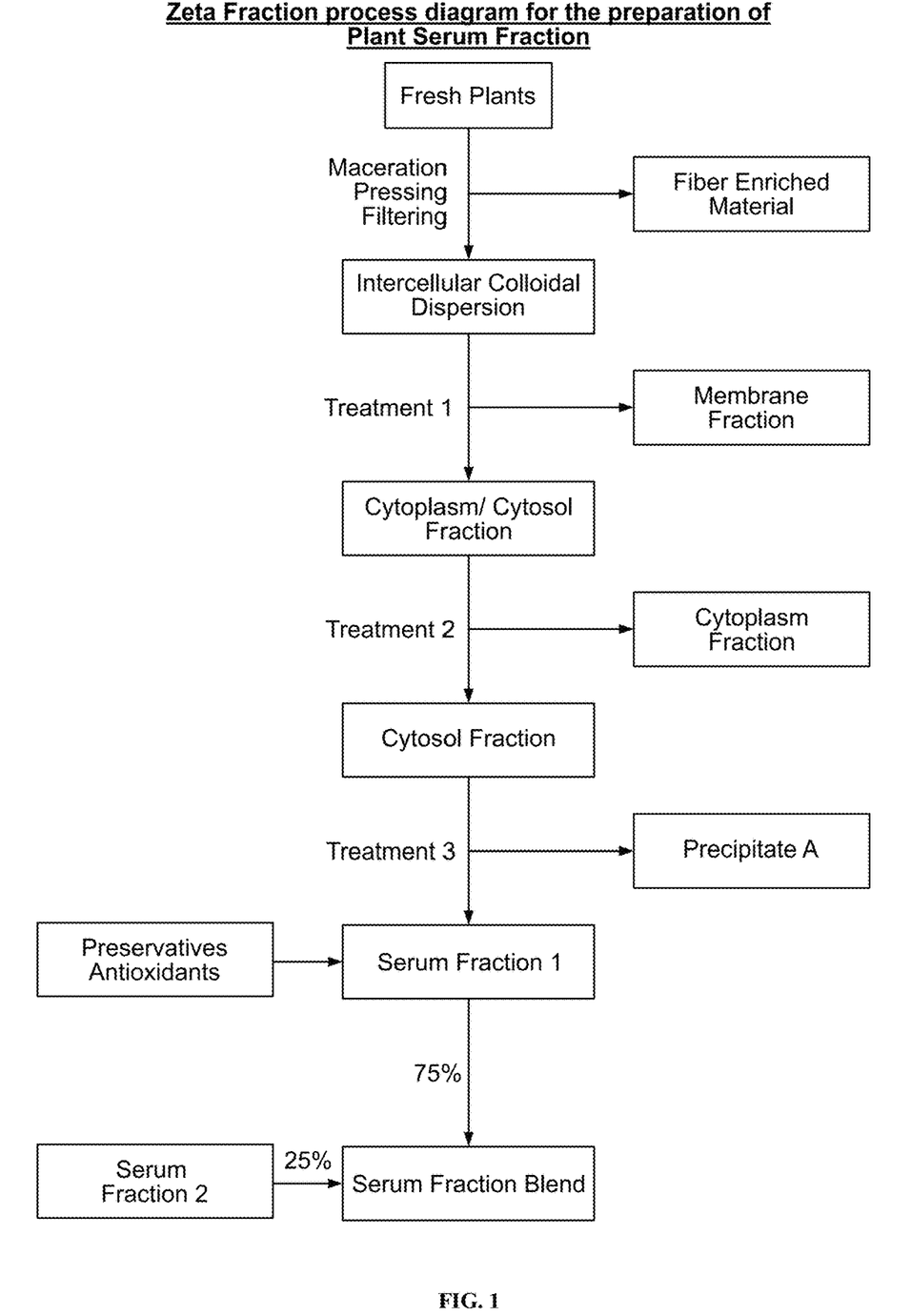
FIG. 1 is a schematic drawing of the fractionating process for preparing the bioactive anti-aging ingredients of the present invention (Zeta Fraction™ process).

"Serum Fraction," as used herein, means a composition produced by a general method wherein no exogenous solvent or liquid is added prior or during said separating comprising the main steps of: macerating, pressing and filtering of fresh plant biomass to obtain an Intercellular Colloidal Dispersion and a Fiber Enriched Material (Cell Wall Fraction); treating (Treatment 1) and fractionating the Intercellular Colloidal Dispersion to obtain a Cytoplasm/Cytosol Fraction and a Membrane Fraction; treating (Treatment 2) and fractionating the Cytoplasm/Cytosol Fraction to obtain a Cytosol Fraction and a Cytoplasm Fraction; and treating (Treatment 3) and fractionating the Cytosol Fraction to yield the Serum Fraction and a precipitate, as illustrated in FIG. 1 and disclosed in U.S. Pat. Nos. 7,473,435; 8,043,635, 8,318,220, U.S. patent application Ser. Nos. 16/078,925, 14/440,831.

"Effective amount" as used herein means an amount of a compound or skin care composition sufficient to significantly induce a positive appearance and/or feel benefit, but low enough to avoid serious side effects (i.e., to provide a reasonable benefit to risk ratio, within the scope of sound judgment of the skilled artisan).

"Preservative" as used herein means, as long as it is used in conventional cosmetics, but the present invention is not particularly limited. As a preservative, for example, p-hydroxybenzoic acid alkyl ester, benzoic acid, sodium benzoate, sorbic acid, potassium sorbate, phenoxyethanol, can be exemplified dehydroacetic acid and its salts and the like. Preservatives may be used alone or in combination.

"Skin hydration" as used herein, means the water content of the skin.

"Day cream composition" as used herein, means a skin care composition comprising (1) a physiologically acceptable medium and (2) an effective amount of a synergistic composition consisting of a blend of a *Nelumbo nucifera* (Sacred Lotus, NN) serum fraction and a *Camellia sinensis* leaves (Tea Plant, CS) serum fraction in a respective weight ratio of 75:25.

"Night cream composition" as used herein, means a skin care composition comprising (1) a physiologically acceptable medium and (2) an effective amount of a synergistic composition consisting of a blend of a *Nelumbo nucifera* (Sacred Lotus, NN) serum fraction and a *Chamomilla recutita* (German Chamomile (*Matricaria*) Flower, CR-F) serum fraction in a respective weight ratio of 75:25

It is obvious that the invention concerns mammals in general, and more specifically human beings.

In one aspect, the present disclosure provides a skin care composition comprising (1) a physiologically acceptable medium and (2) an effective amount of a synergistic composition consisting of a blend of *Nelumbo nucifera* (Sacred Lotus) serum fraction either with a *Camellia sinensis* (Tea) serum fraction or with a *Chamomilla recutita* (German chamomile) serum fraction in a respective weight ratio of 75:25.

In one aspect, the present disclosure provides a skin care composition comprising (1) a physiologically acceptable medium and (2) an effective amount of a synergistic composition consisting of a blend of a *Nelumbo nucifera* (Sacred Lotus, NN) serum fraction and a *Camellia sinensis* leaves (Tea Plant, CS) serum fraction in a respective weight ratio of 75:25.

In another aspect, the present disclosure provides a skin care composition comprising (1) a physiologically acceptable medium and (2) an effective amount of a synergistic composition consisting of a blend of a *Nelumbo nucifera* (Sacred Lotus, NN) serum fraction and a *Chamomilla recutita* (German Chamomile (*Matricaria*) Flower, CR-F) serum fraction in a respective weight ratio of 75:25.

In accordance with the present disclosure, it was unexpectedly found that a blend of serum fractions of *Nelumbo nucifera* (Sacred Lotus, NN) and *Camellia sinensis* leaves (Tea Plant, CS) at the specific weight ratio of 75:25 or a blend of serum fractions of *Nelumbo nucifera* (Sacred Lotus, NN) and *Chamomilla recutita* (German Chamomile (*Matricaria*) Flower, CR-F) at the specific weight ratio of 75:25 described herein has synergistic properties associated with improving the appearance of skin associated to skin aging.

The serum fractions of the present invention were obtained from fresh (living) whole plants of *Nelumbo nucifera* Gaertn. (Sacred Lotus, NN), from fresh leaves of *Camellia sinensis* leaves (Tea Plant, CS) and from fresh flowers of *Chamomilla recutita* (German Chamomile (*Matricaria*) Flower, CR-F), according to the fractionating process not found in nature described in U.S. Pat. Nos. 7,473,435; 8,043,635; 8,318,220, US patent application, herein incorporated by reference.

This manufacturing process employs macerating and pressing fresh living plants in order to obtain a plant cell juice (Intracellular Colloidal Dispersion) and treat it with electromagnetic waves at a frequency effective to initiate separation of membrane fraction from cell juice in order to yield a cell cytoplasm/cytosol fraction substantially free from membrane fraction.

The overall fractionating process for preparing the serum fraction of the present invention is described below in reference to FIG. 1. Fresh plants are harvested, collected, and washed to yield fresh plant biomass. This fresh plant biomass is subjected to maceration, pressing and filtering to yield fiber-enriched material (Cell Wall Fraction) and Intercellular Colloidal Dispersion (ICD). ICD is exposed to isoelectric treatment followed by electromagnetic waves treatment at a frequency of between 2.45 GHz and 7.0 GHz to trigger its destabilization (Treatment 1). The destabilized ICD is then subjected to centrifugation to yield a precipitated Membrane Fraction and a Cytoplasm/Cytosol Fraction. The pellet of Membrane Fraction is removed. The Cytoplasm/Cytosol Fraction is then subjected to isoelectric treatment and centrifugation (Treatment 2) to yield a precipitated Cytoplasm Fraction and a Cytosol Fraction. The pellet of Cytoplasm Fraction is removed. The Cytosol Fraction is a clear liquid which has a slight yellow color and slight characteristic odor. In several hours, the unstable Cytosol Fraction is irreversibly transformed into dark brown color suspension containing heavy precipitate and strong non-characteristic odor. As a result, Cytosol Fraction cannot be used as a cosmetic ingredient. The described procedure that follows allows for the refinement of Cytosol Fraction to yield stable and active Serum Fraction which is a stable cosmetic ingredient. This is accomplished by applying treatments to the Cytosol Fraction to remove the major components responsible for the irreversible transformations that lead to the generation of unwanted precipitate and deterioration of color and odor. Treatments include but are not limited to isoelectric treatment and centrifugation (Treatment 3) as described in U.S. Pat. Nos. 7,473,435; 8,043,635; 8,318,220, which are all incorporated herein by reference.

Each plant is processed separately to obtain a Serum Fraction as depicted in FIG. 1.

After the Serum Fraction is produced, it may be further subjected to the stabilizing step to yield the stabilized Serum Fraction. In one embodiment, the stabilizing step involves incubating the Serum Fraction in a mixture of at least one preservative and at least one antioxidant to yield a stabilized Serum Fraction. Suitable preservatives for use in the present invention include, for example, potassium sorbate, sodium benzoate and sodium phytate.

In one embodiment a suitable antioxidant for use is ascorbic acid.

In one embodiment, the stabilizing step involves incubating the Serum Fraction in a mixture of at least one preservative, at least one chelating agent, at least one antioxidant, and at least one preservative efficacy booster to yield a stabilized Serum Fraction.

In one embodiment agents for use in the stabilizing step of the present invention are chosen among potassium sorbate, sodium benzoate, ascorbic acid, and sodium phytate.

In another embodiment the preservative booster is a pure, bio-based 1,3 propanediol (Zemea®).

In one embodiment the preservative mixture represents 0.2% to 0.75% of the stabilized serum fraction.

In one embodiment Serum fractions are blended in a respective weight ratio of 75:25 of *Nelumbo nucifera* Gaertn. (Sacred Lotus, NN) and *Camellia sinensis* leaves (Tea Plant, CS) to prepare the synergistic composition consisting of a blend of *Nelumbo nucifera* (Sacred Lotus, NN) serum fraction and *Camellia sinensis* leaves (Tea Plant, CS) serum fraction (NN+CS) of the present invention.

In another embodiment Serum fractions are blended in a respective weight ratio of 75:25 of *Nelumbo nucifera* Gaertn. (Sacred Lotus, NN) and *Chamomilla Recutita* flowers (German Chamomile (*Matricaria*) Flower, CR-F) to prepare the synergistic composition consisting of a *Nelumbo nucifera* (Sacred Lotus, NN) serum fraction and *Chamomilla recutita* (German Chamomile (*Matricaria*) Flower, CR-F) serum fraction of the present invention.

According to the present invention an effective amount of the synergistic blend of *Nelumbo nucifera* Gaertn. (Sacred Lotus, NN) and *Camellia sinensis* leaves (Tea Plant, CS) serum fraction in a respective weight ratio of 75:25 or the synergistic blended of *Nelumbo nucifera* Gaertn. (Sacred Lotus, NN) and *Chamomilla recutita* (German Chamomile (*Matricaria*) Flower, CR-F) serum fraction in a respective weight ratio of 75:25, is used to prepare the skin care composition.

In another embodiment the synergistic blend of *Nelumbo nucifera* Gaertn. (Sacred Lotus, NN) serum fraction and *Camellia sinensis* leaves (Tea Plant, CS) serum fraction in a respective weight ratio of 75:25 is used at the concentration of 0.01 to 2% in weight of the weight of the final skin care composition.

In another embodiment the synergistic blend of *Nelumbo nucifera* Gaertn. (Sacred Lotus, NN) serum fraction and *Chamomilla recutita* (German Chamomile (*Matricaria*) Flower, CR-F) serum fraction in a respective weight ratio of 75:25, is used at the concentration of 0.01 to 2% in weight of the weight of the final skin care composition.

In one embodiment the compositions advantageously may include only emollients that are naturally-derived and/or naturally-processed, while exhibiting feel and other aesthetic characteristics similar to those provided by non-eco-friendly emollients.

The composition may include an emollient blend including a plurality of emollients which provide different polarity characteristics. For example, different polarity characteristics may be provided by inclusion of different emollients including differing chain length and/or number of chains characteristics. For example, in an embodiment, the emollients are naturally-processed, naturally derived esters of natural alcohols and natural carboxylic acids.

In one embodiment, the skin care composition is intended for topical administration.

In accordance with the present disclosure, the skin care compositions may in particular be in the form of an aqueous, hydro-alcoholic or oily solution; and oil-in-water emulsion, a water-in-oil emulsion or multiple emulsions; they may also be in the form of suspensions, or powders, suitable for application on the skin, mucous membranes, lips and/or hair.

These skin care compositions may be more or less fluid and have the appearance of a cream, a lotion, a milk, a serum, a pomade, a gel, a paste, a patch or a foam. They may also be in solid form such as a stick or be applied on the skin in the form of aerosol.

These skin care compositions may also include any additive commonly used in the field of application envisaged, as well as the adjuvants necessary for their formulation, such as solvents, thickeners, diluents, antioxidants, coloring agents, sunscreens, self-tanning agents, pigments, fillers, preservatives, fragrances, odor absorbers, cosmetic or pharmaceutical active agents, essential oils, vitamins, essential fatty acids, surfactants, film-forming polymers, and so on.

In every case, a person skilled in the art will ensure that said adjuvants (excipients) as well as the proportions thereof are chosen so as not to interfere with the desired advantageous properties of the skin care composition of the invention. These adjuvants may, for example, correspond to 0.01 to 20% of the total weight of the skin care composition. When the skin care composition of the invention is an emulsion, the fatty phase may represent 5 to 80% by weight and preferably 5 to 50% by weight with respect to the total weight of the skin care composition. The emulsifiers and co-emulsifiers used in the skin care composition will be chosen from those conventionally used in the field considered. For example, they may be used in a concentration ranging from 0.3 to 30% by weight, with respect to the total weight of the skin care composition.

The skin care composition capable of being used according to the invention may be applied by any suitable route, in particular by external topical route, and the formulation of the skin care compositions will be adapted by a person skilled in the art.

Advantageously, the skin care compositions according to the invention are in a form suitable for topical application. These skin care compositions must therefore contain a physiologically acceptable medium, i.e. compatible with the skin and skin appendages, and cover all cosmetic forms.

In yet another aspect, the present invention provides a method of improving skin appearance associated with skin aging. The method comprises the step of applying an anti-aging skin care composition to a skin surface having at least one sign of aging.

The present invention provides a day cream composition and a night cream composition for improving skin appearance associated with skin aging.

The present invention is directed to a method for improving skin appearance associated with anti-inflammation and antioxidant defense, comprising topically applying the skin care composition comprising (1) a physiologically acceptable medium and (2) a synergistic composition consisting of a blend of *Nelumbo nucifera* Gaertn. (Sacred Lotus, NN) serum fraction and *Camellia sinensis* leaves (Tea Plant, CS) serum fraction in a respective weight ratio of 75:25 or consisting of a blend of *Nelumbo nucifera* Gaertn. (Sacred Lotus, NN) serum fraction and *Chamomilla recutita* (German Chamomile *Recutita* (*Matricaria*), CR-F) in a respective weight ratio of 75:25.

The present invention also relates to a cosmetic method for improving the appearance of the skin associated with skin aging of a mammal, improving skin hydration, skin barrier function, skin laxity, skin appearance of wrinkles, skin pigmentation, and/or skin tone, comprising applying as topical skin applications, to facial or body skin surface a skin care a composition comprising (1) a physiologically acceptable medium and (2) a synergistic composition consisting of a blend of *Nelumbo nucifera* Gaertn. (Sacred Lotus, NN) serum fraction and *Camellia sinensis* leaves (Tea Plant, CS) serum fraction in a respective weight ratio of 75:25 or consisting of a blend of *Nelumbo nucifera* Gaertn. (Sacred Lotus, NN) serum fraction and *Chamomilla recutita* (German Chamomile *Recutita* (*Matricaria*), CR-F) in a respective weight ratio of 75:25.

The present invention also relates to a method for mitigating adverse effects caused by full spectrum sunlight, UV radiations and surfactants.

Inflammation is a complex cascade of biological reactions mediated by signaling substances including, but not limited to vasoactive amines such as histamine, products of arachidonic acid metabolism such as prostaglandins, and signaling proteins such as chemokines and interleukins in particular. Certain signaling molecules are particularly important in regulating the inflammation and quantification of inflammatory activity due to factors including but not limited to their position in inflammatory signaling cascades, broadness of their range of pro-inflammatory effects, and comparative efficacy at triggering the inflammatory responses.

In one embodiment, biomarkers of mammalian inflammation include, without limitation, biomarkers that are associated with Interleukin-1 alpha (IL-1α) inflammation cascades. IL-1α. is an inflammatory cytokine, which is induced by irritants, and is often released from epidermal skin cells at the early stage of inflammation cascade. Subsequently, it leads to the induction of down-stream secondary inflammatory mediators including chemokine IL-8, followed by morphological alterations and finally the development of signs of skin inflammation. Therefore, by reducing secretion of IL-1α and IL-8, an initial inflammatory response mediator and a key chemotactic factor, skin inflammation and irritation can be reduced, prevented, and/or eliminated.

In accordance with the present disclosure, the synergistic composition consisting of a blend of *Nelumbo nucifera* Gaertn. (Sacred Lotus, NN) serum fraction and *Camellia sinensis* leaves (Tea Plant, CS) serum fraction in a respective weight ratio of 75:25 has a combination of properties selected from the group consisting of the following: (i) inhibition of Interleukin (IL)-1α induced by SDS; (ii) inhibition of IL-8 induced by full-sun spectrum; (iii) beneficial spectral absorbance characteristics in UVA-UVB area; (iv) high UVA:UVB absorbance ratios in conjunction with broad UVA and UVB spectral absorption photostability demonstrated after full spectrum simulated sun exposures; (v) increased attenuation in UVA area and simulations increase in UVA/UVB ratio as radiation dose is increased; (vi)

additional biological activities (properties) demonstrated in various in vitro enzymatic models; (vii) combinations thereof.

In another aspect of the present disclosure, the synergistic composition consisting of a blend of *Nelumbo nucifera* Gaertn. (Sacred Lotus, NN) serum fraction and *Chamomilla recutita* (German Chamomile *Recutita* (*Matricaria*), CR-F) in the weight ratio of 75:25 has a combination of properties selected from the group consisting of the following: (i) inhibition of Interleukin (IL)-1α induced by SDS; (ii) inhibition of IL-8 induced by full-sun spectrum; (iii) beneficial spectral absorbance characteristics in UV A-UVB area; (iv) high UVA:UVB absorbance ratios in conjunction with broad UVA and UVB spectral absorption photostability demonstrated after full spectrum simulated sun exposures; (v) increased attenuation in UVA and UVB areas and simulations increase in UVA/UVB ratio as radiation dose is increased; (vi) additional biological activities (properties) demonstrated in various in vitro enzymatic models; (vii) combinations thereof.

In accordance with various embodiments of the methods of the present disclosure, the skin surface is selected from the group consisting of a body skin surface and a facial skin surface.

In some embodiments of the methods of the present disclosure, the anti-aging skin care composition further comprises an additional ingredient selected from the group consisting of a sunscreen active, an anti-inflammatory agent, and a skin tone agent.

The present invention also relates to the uses of synergistic serum fraction blends, comprising fresh (living) whole plant of *Nelumbo nucifera* Gaertn. (Sacred Lotus, NN) and *Camellia sinensis* leaves (Tea Plant, CS) or fresh (living) whole plant of *Nelumbo nucifera* Gaertn. (Sacred Lotus, NN) and *Chamomilla recutita* (German Chamomile (*Matricaria*) Flower, CR-F). in various formulations (as disclosed in example 8 to 11) intended for topical skin applications.

The present invention also relates to a cosmetic care method including applying the topical day cream composition on at least a portion of the skin of the body or face, of a skin care composition comprising *Nelumbo nucifera* Gaertn. (Sacred Lotus, NN) serum fraction and *Camellia sinensis* leaves (Tea Plant, CS) serum fraction in a respective weight ratio of 75:25 and a physiologically acceptable medium, in order to improve the appearance of skin associated with skin aging.

The present invention also relates to a cosmetic care method including applying the topical night cream composition on at least a portion of the skin of the body or face, of a skin care composition comprising *Nelumbo nucifera* Gaertn. (Sacred Lotus, NN) serum fraction and *Chamomilla recutita* (German Chamomile (*Matricaria*) Flower, CR-F) serum fraction in a respective weight ratio of 75:25 and a physiologically acceptable medium, in order to improve the appearance of skin associated with skin aging.

Specific embodiments of this cosmetic treatment method also result from the above description. Other advantages and features of the invention will be more apparent upon reading the examples provided for illustrative and non-limiting purposes.

EXAMPLES

The following examples are intended to illustrate particular embodiments of the present invention but are by no means intended to limit the scope of the present invention.

Example 1: Evaluation of Free Radical Scavenging Activity

Human skin is constantly directly exposed to the air, solar radiation, environmental pollutants, or other mechanical and chemical insults, which are capable of inducing the generation of free radicals and reactive oxygen species (ROS) that result in inflammation and extrinsic skin aging [Borut Poljšak and Raja Dahmane, Free Radicals and Extrinsic Skin Aging. Dermatol Res Pract. 2012:135206, 2012]. Free radical is a molecule or an atom with one or more unpaired valence shell electrons. Such substances are often but not always unstable, chemically transient and highly reactive. Free radicals can be produced by many processes including combustion, irradiation by sunlight, and normal metabolism—especially involving cellular respiration, immune response and inflammation processes. In biological systems, free radicals most commonly involve oxygen metabolism and reactive oxygen species. High reactivity of free radicals can let them damage biological molecules. In cases where products of such reactions are free radicals themselves, this can lead to a cascade of damage. Free radicals are both the earliest inflammation messengers and key parts of inflammatory damage mechanisms. Excess of free radicals contributes to self-sustaining loops of harmful inflammation. This is particularly relevant in the human skin as the organ most exposed to environmental stresses which generate free radicals. Quenching and scavenging these free radicals could help mitigate and prevent signs of skin damage and skin aging.

Materials and Methods

DPPH (2-Diphenyl-1-Picrylhydrazyl) is a stable free radical; its radical form in methanolic solution is violet, while the quenched form is pale yellow. This color change and its kinetic provide qualitative judgment about the speed of the free radical scavenging by test articles. DPPH free radical scavenging activity was determined by the assay adapted from Brand-Williams et al. [Brand-Williams W, Cuvelier M E, Berset C. Use of a free radical method to evaluate antioxidant activity. LWT—Food Science and Technology, 28:25-30, 1995] for use with glass-coated polypropylene 96-well plates (from SUN-Sri, Rockwood, TN, USA; catalog number 400 062) and Synergy 2 microplate reader (from BioTek Instruments Inc, Winooski, VT, USA). Absorbance was measured at 515 nm wavelength. Reaction volume in each well was 200 µl; initial concentration of DPPH was 114 µM. Stoichiometry of the reaction was calculated and expressed as milligrams of DPPH quenchable by one gram of test article. Data are expressed as average of milligrams of DPPH quenchable by one gram of test article in triplicate.

Results

Figure 2:
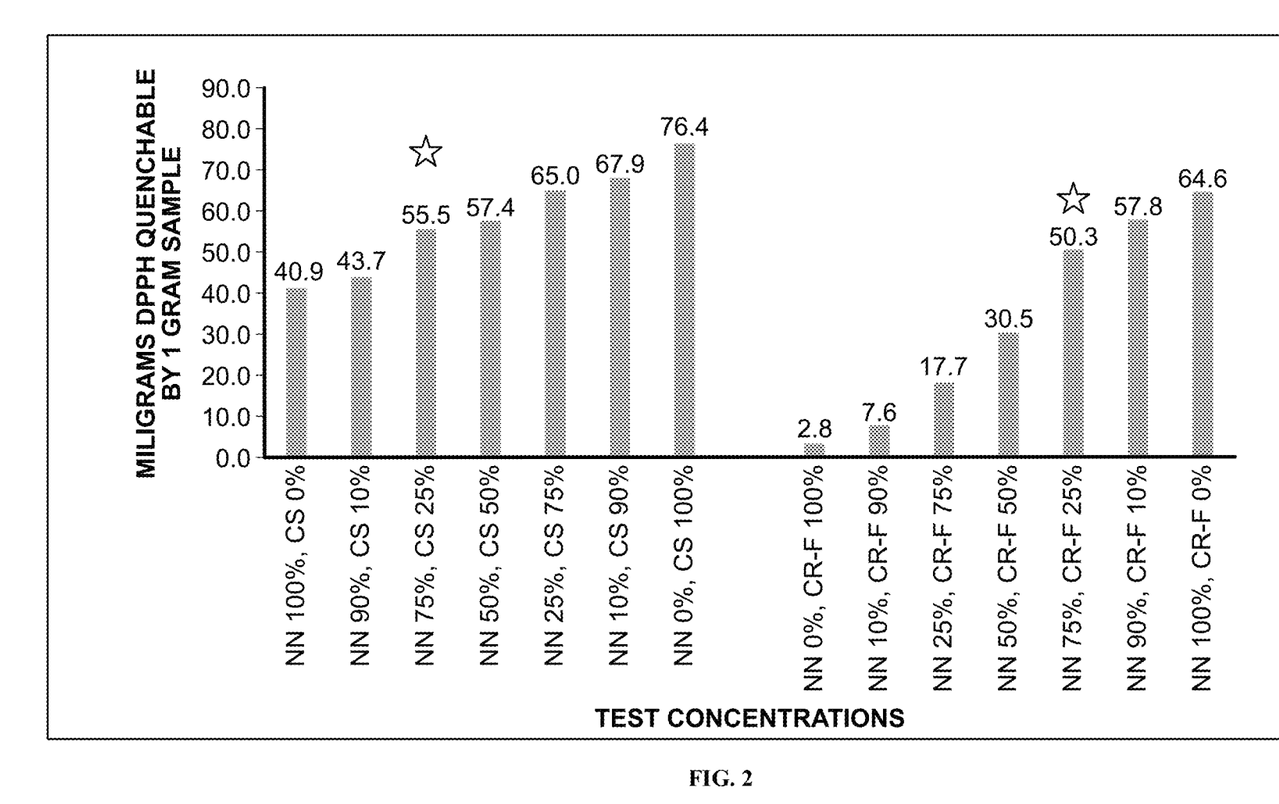
FIG. 2. Identification of Synergistic Effect of blends of NN+CS and blends of NN+CR-F at different ratios in DPPH Free Radical Scavenging.

FIG. 2. Identification of Synergistic Effect of NN+CS and NN+CR-F at different ratios in DPPH Free Radical Scavenging

TABLE 1.1

Identification of Potential Synergistic Effect of NN + CS Blends at Different Ratios in DPPH Free Radical Scavenging

| NN:CS Ratio (%) | Actual Value* | Est. Medium Value* | Actual − Est. Value* |
|---|---|---|---|
| 100:0 | 40.9 | — | — |
| 90:10 | 43.7 | 48.2 | −4.5 |
| 75:25 | 55.5 | 50.6 | 4.95 |

TABLE 1.1-continued

Identification of Potential Synergistic Effect of NN +
CS Blends at Different Ratios in DPPH Free Radical Scavenging

| NN:CS Ratio (%) | Actual Value* | Est. Medium Value* | Actual − Est. Value* |
|---|---|---|---|
| 50:50 | 57.4 | 60.3 | −2.9 |
| 25:75 | 65.0 | 62.7 | 2.3 |
| 10:90 | 67.9 | 70.7 | 2.8 |
| 0:100 | 76.4 | — | — |

*Results are calculated and expressed as average of milligrams of DPPH quenchable by one gram of test article.
"Exp." refers "Expected".

TABLE 1.2

Identification of Potential Synergistic Effect of NN +
CR-F Blends at Different Ratios in DPPH Free Radical Scavenging

| NN:CR-F Ratio (%) | Actual Value* | Exp. Medium Value* | Actual − Exp. Value* |
|---|---|---|---|
| 0:100 | 2.8 | — | — |
| 10:90 | 7.6 | 10.3 | −2.7 |
| 25:75 | 17.7 | 19.1 | −1.4 |
| 50:50 | 30.5 | 34.0 | −3.5 |
| 75:25 | 50.3 | 44.2 | 6.15 |
| 90:10 | 57.8 | 57.5 | 0.4 |
| 100:0 | 64.6 | — | — |

*Results are calculated and expressed as average of milligrams of DPPH quenchable by one gram of test article.
"Exp." refers "Expected".

As shown in FIG. 2, Table 1.1 and 1.2, a set of seven blends of different ratios of serum fraction of *Nelumbo nucifera* Gaertn. (Sacred Lotus, NN) and *Camellia sinensis* leaves (Tea Plant, CS) were prepared at set concentrations ranging from 0% to 100% of each fraction. A second set of seven blends of different ratios of serum fraction of *Nelumbo nucifera* Gaertn. (Sacred Lotus, NN) and *Chamomilla recutita* (German Chamomile (*Matricaria*) Flower, CR-F) were also prepared at set concentrations ranging from 0% to 100% of each fraction. Both sets of blends, NN+CS and NN+CR-F were then tested using DPPH Free Radical Scavenging Assay to determine the milligrams of DPPH quenchable by one gram of sample and to determine which blend ratios demonstrated any potential synergistic effect.

The milligrams DPPH quenchable by one gram of sample were determined for each in both sets of blends, which showed dose-dependent DPPH Free Radical Scavenging (FIG. 2, Table 1.1 and 1.2). In Table 1.1 and 1.2, the "Exp. (Expected) Medium Value" of milligrams DPPH quenching for each ratio of the blends is calculated as the average of its preceding "Actual Value" and subsequent "Actual Value". The difference between the "Actual Value" and the "Exp. Medium Value" at any given ratio is used to determine potential synergy of the blend. The highest positive value of the "Actual Value" minus "Exp. Medium Value" of DPPH quenchable by one gram of a blend indicates potential synergistic effect of the blend at that ratio. Surprisingly, both NN+CS (75%+25%) blend and NN+CR-F (75%+25%) blend demonstrated potential synergistic effects as shown in FIG. 2 (indicated by stars) and Table 1.1 and 1.2 (indicated by numbers in bold font).

Example 2: Mitigating SDS-Induced Inflammatory Cytokine IL-1α

Surfactants are used in a variety of personal care and cleansing products to allow or improve processes of cleansing, foaming, emulsifying, solubilizing, and dispersing. Repetitive contact with surfactant-containing products has been shown to cause damage of the skin barrier due to surface or interface activities of the surfactants [Walters R M, Mao G, Gunn E T et al. Cleansing formulations that respect skin barrier integrity. Dermatol Res Pract 2012; 495917: 1-9]. The weakened barrier subsequently leads to deeper penetration of the surfactants into skin and induced irritation and inflammation, which can be perceived by consumers as dryness, itchiness, swelling, redness, and pain [De Jongh C M, Jakasa I, Verberk M M, Kezic S. Variation in barrier impairment and inflammation of human skin as determined by sodium lauryl sulphate penetration. Br J Dermatol 2006; 154 (4): 651-7; Ananthapadmanabhan K P, Yang L, Vincent C et al. A novel technology in mild and moisturizing cleansing liquids. Cosmetic Dermatology® 2009; 22 (6): 307-316]. As surfactants are widely used in hand soaps, facial and body washes, shampoos and conditioners, as well as dish, laundry and housecleaning detergents, human skin contact with surfactants is frequent. Therefore, mitigating surfactant-induced skin inflammatory responses is highly desirable. One of the methods to study and quantify such inflammation is by culturing cells of the tissue most likely to come in contact with surfactants, such as viable epidermal keratinocytes from human skin.

Keratinocytes have become the focus of attention in irritant-induced skin inflammation by virtue of their epidermal location, importance in maintaining the integrity of the stratum corneum barrier, and the ability to produce a variety of inflammatory mediators [Welss T, Basketter D A, Schroder K R. In vitro skin irritation: facts and future. State of the art review of mechanisms and models. Toxicol In Vitro 2004; 18 (3): 231-43]. Keratinocytes contain Interleukin (10-1a, one of the primary cytokines which can be additionally induced and released at an early stage of inflammation cascade in response to a range of irritants including surfactants. Sodium dodecyl sulfate (SDS) or sodium lauryl sulfate (SLS) is an anionic surfactant used in many cleaning and hygiene products for personal and home care. SDS is a well-known inducer of experimental irritant contact dermatitis. It has been shown to stimulate multiple cytokine release, including IL-1α, in epidermal skin cells [Craig et al., JID 115:292, 2000; and Chung et al., JID 117:647, 2001]. The release of inflammatory mediators such as IL-8 and IL-6 from HEK, downstream of IL-1α, critically contributes to skin morphological changes and development of the signs of skin inflammation and irritation [Welss, D. A. Basketter, and K. R. Schröder, In vitro skin irritation: facts and future. State of the art review of mechanisms and models, Toxicology in Vitro, vol. 18, no. 3: 231-243]. Therefore, evaluation of serum fraction blends in reducing the HEK release of the initial inflammatory response mediator IL-1α induced by SDS, could contribute to control the signs of the skin irritation, inflammation, and aging.

Materials and Methods

Normal human adult epidermal keratinocytes (HEK) and all cell culture supplies were obtained from Life Technologies Co. (Carlsbad, CA, USA). The cells were grown and then maintained in keratinocyte basal medium 154 (M154) with added human keratinocyte growth supplements (HKGS) at 37° C. in an atmosphere of 5% $CO_2$ and used between passages 2 to 4. For the experiments, HEK cells were trypsinized, seeded in 96-well plates, and grown to ~80% confluence. Specific concentrations of SDS were used for induction of chemokines and cytokines in the cultured HEK cells. IL-1α was induced with 25 µg/mL SDS. The cells were exposed for 16 hours to either SDS alone, or in combination with test articles at various concentrations in triplicates. After incubation, HEK cell supernatants were collected, and levels of interleukins were quantified using Quantikine® ELISA kits from R&D Systems Inc. IL-1α was quantified with catalogue number SLA50 kit. Percent (%) inhibition of IL-1α by the test articles were calculated by comparing to controls from non-SDS-induced cells considered as 0% and from SDS-induced cells considered as 100%. LDH assay using Cytoscan™ LDH Assay kit (G-Biosciences Cat. No. 786-324) was performed on all HEK culture supernatants to make sure all tested concentrations had no cytotoxicity, and Kit-supplied lysis buffer was used as positive control.

Results

Figure 3:
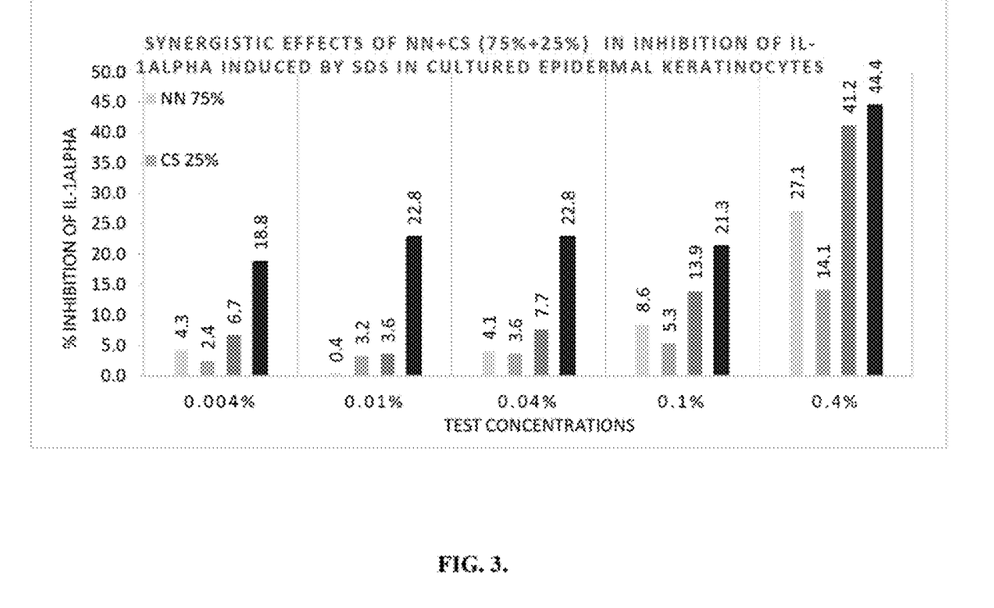
FIG. 3. Synergistic Effect of NN+CS (75%+25%) Blend in Inhibition of IL-1α Induced by SDS in Cultured Epidermal Keratinocytes.

FIG. 3. Synergistic Effect of NN+CS (75%+25%) Blend in Inhibition of IL-1α Induced by SDS in Cultured Epidermal Keratinocytes

TABLE 2.1

Synergistic Effect of NN + CS (75% + 25%) in Inhibition of IL-1α Induced by SDS in Cultured Epidermal Keratinocytes

| Concentration | NN 75%* | CS 25%* | NN 75% + CS 25% Additive Effect* | NN + CS (75% + 25%) Synergistic Effect* |
|---|---|---|---|---|
| 0.004% | 4.3 | 2.4 | 6.7 | 18.8 |
| 0.01% | 0.4 | 3.2 | 3.6 | 22.8 |
| 0.04% | 4.1 | 3.6 | 7.7 | 22.8 |
| 0.1% | 8.6 | 5.3 | 13.9 | 21.3 |
| 0.4% | 27.1 | 14.1 | 41.2 | 44.4 |

*Results are calculated and expressed as average of % inhibition of IL-1α by test articles vs. vehicle controls.

Based on the identification of synergistic effect of the two blends in DPPH Free Radical Scavenging in Example 1, further evaluation of these blends was performed to assess their capability to inhibit surfactant-induced inflammation in cultured human epidermal keratinocytes (HEK). For reference, Aspirin as an anti-inflammatory benchmark shows $IC_{50}$ of 230 µg/ml in inhibiting SDS-induced IL-1α. As shown in the FIG. 3 and Table 2.1, individual serum fraction of *Nelumbo nucifera* Gaertn. (Sacred Lotus, NN) and *Camellia sinensis* leaves (Tea Plant, CS), as well as their blend (NN+CS), were evaluated at five different concentrations according to the method described herein. Percent (%) inhibition of inflammatory cytokine IL-1α induced by SDS, versus placebo-treated SDS-induced control, was determined for assessing anti-irritation and anti-inflammatory activities of the test articles in HEK. The higher % inhibition indicates the more desired activities, thus positive anti-irritation and anti-inflammatory benefits. Additive effect was derived from the sum of individual inhibitory activities of NN 75% and CS 25%. Surprisingly, the blend of NN+CS (75%+25%) showed synergistic effect in all the test concentrations, as the % inhibition of IL-1α by the blends is higher than that of the sum of individual serum fractions.

Figure 4:
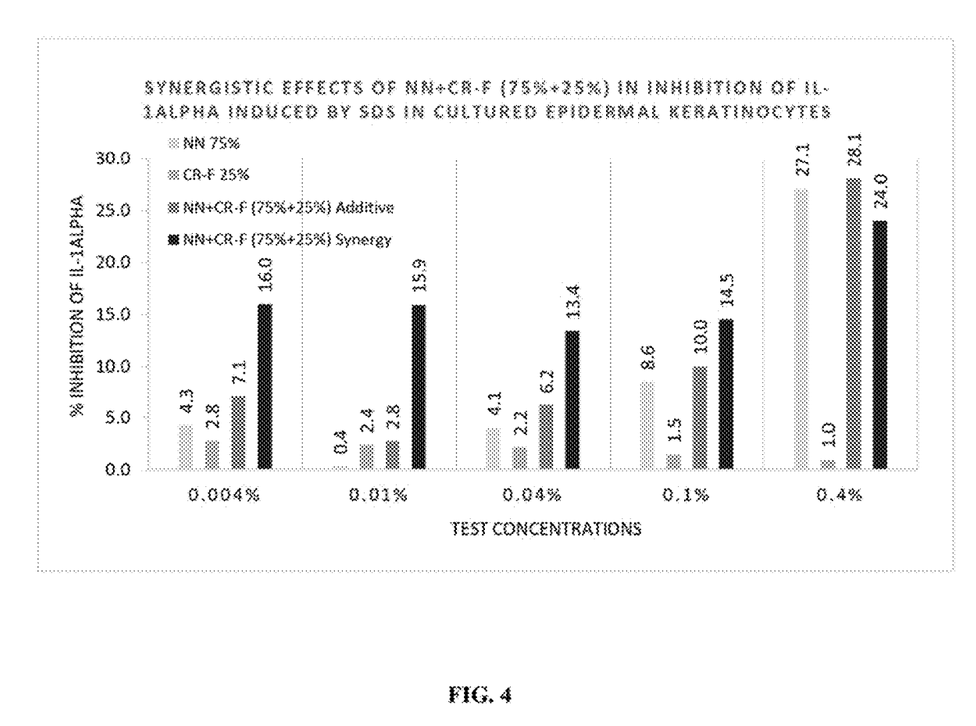
FIG. 4. Synergistic Effect of NN+CR-F (75%+25%) Blend in Inhibition of IL-1α Induced by SDS in Cultured Epidermal Keratinocytes.

FIG. 4. Synergistic Effect of NN+CR-F (75%+25%) Blend in Inhibition of IL-1α Induced by SDS in Cultured Epidermal Keratinocytes

TABLE 2.2

Synergistic Effect of NN + CR-F (75% + 25%) Blend in Inhibition of IL-1α Induced by SDS in Cultured Epidermal Keratinocytes

| Concentration | NN 75%* | CR-F 25%* | NN 75% + CR-F 25% Additive Effect* | NN + CR-F (75% + 25%) Synergistic Effect* |
|---|---|---|---|---|
| 0.004% | 4.3 | 2.8 | 7.1 | 16.0 |
| 0.01% | 0.4 | 2.4 | 2.8 | 15.9 |
| 0.04% | 4.1 | 2.2 | 6.2 | 13.4 |
| 0.1% | 8.6 | 1.5 | 10.0 | 14.5 |
| 0.4% | 27.1 | 1.0 | 28.1 | 24.0 |

*Results are calculated and expressed as average of % inhibition of IL-1α by test articles vs. vehicle controls.

As shown in the FIG. 4 and Table 2.2, individual serum fraction of *Nelumbo nucifera* Gaertn. (Sacred Lotus, NN) and *Chamomilla recutita* (German Chamomile (*Matricaria*) Flower, CR-F), as well as their blend (NN+CR-F), were evaluated in triplicate at five different concentrations according to the method described herein. Percent (%) inhibition of inflammatory cytokine IL-1α induced by SDS, versus placebo-treated SDS-induced control, was determined for assessing anti-irritation and anti-inflammatory activities of the test articles in HEK. The higher % inhibition indicates the more desired activities, thus positive anti-irritation and anti-inflammatory benefits. Additive effect was derived from the sum of individual inhibitory activities of NN 75% and CR-F 25%. Synergistic effect was determined if the % inhibition of IL-1α by the blend is higher than that of the sum of individual serum fractions. Surprisingly, the blend of NN+CR-F (75%+25%) showed synergistic effect in all the test concentrations, except at 0.4%.

Example 3: Mitigating Full Sun Spectrum-Induced Inflammatory Chemokine IL-8

Sunlight, or the full sun spectrum is composed of electromagnetic rays of different wavelengths, ranging from short wavelength, high energy, ultraviolet radiation (UVR) rays to visible light (VL) and to long wavelength, low energy, infrared radiation (IRR) rays. The role of solar radiation in skin aging is well established. Numerous studies have been conducted to analyze the underlying mechanisms and to develop strategies to prevent or at least delay photoaging of human skin [J. Krutmann et al. The skin aging exposome. J. Derm. Sci. 85:3, 152-161, 2017; Barbara A. Gilchrest, Photoaging. J. Invest. Derm. Vol. 133, Suppl. 2, July 2013, E2-E6].

IL-8 is an oxidative stress-responsive proinflammatory chemokine, released from various cells following particle-induced oxidative stress leading to neutrophil influx and inflammation. IL-8 is a potent chemoattractant and activator of neutrophils, the transcription of which is NF-κB dependent [C. K. Sen, "Cellular thiols and redox-regulated signal transduction," Current Topics in Cellular Regulation, vol. 36, pp. 1-30, 2000]. As chemokines are important mediators for sun-induced inflammatory response, it has been shown that IL-8 is upregulated in human keratinocytes following UVB-irradiation (Pernet, V. Sagot, D. Schmitt, J. Viac. UVA1 and UVB radiation but not PGE2 stimulate IL-8 release in normal human keratinocytes. Arch Dermatol Res, 291:527-529, 1999; Strickland, L. E. Rhodes, B. F. Flanagan, P. S. Friedmann. TNF-[alpha] and IL-8 are upregulated in the epidermis of normal human skin after UVB exposure: correlation with neutrophil accumulation and E-Selectin expression. J Invest Dermatol, 108:763-768, 1997]. Therefore, IL-8 effectively stimulates neutrophils to migrate to the inflammatory site and plays an important role in solar radiation-induced skin inflammation. Cell culture-based bioassays utilize cultured epidermal keratinocytes that release numerous signaling molecules including chemokine IL-8 in response to sunlight. Amounts of these mediators are measured via techniques such as Enzyme-Linked Immunosorbent Assay (ELISA). It is known that bioactive ingredients capable of reducing HEK release of these inflammatory mediators may help control the signs of irritation and inflammation in human skin resulting from sun exposure.

Materials and Methods

Normal human adult epidermal keratinocytes (HEK) and all cell culture supplies were obtained from Life Technologies Co. (Carlsbad, CA, USA). The cells were grown and then maintained in keratinocyte basal medium 154 (M154) with added human keratinocyte growth supplements (HKGS) at 37° C. in an atmosphere of 5% $CO_2$ and used between passages 2 to 4. For the experiments, HEK cells were trypsinized, seeded in 96-well plates, and grown to ~80% confluence. The cells were washed once, and M154 was replaced with PBS. Both the washing and the replacement were done with PBS, to remove light-absorbing components of M154. The 96-well plate containing HEK was then covered with UV-transparent 1 mm quartz sheet, placed on white underlay atop controlled Peltier-cooled surface maintaining room temperature, and irradiated with a dose of 20 J/cm2 of artificially produced full spectrum sunlight at dose rate of about 1100 W/m2, as measured via pyranometer through same quartz cover. PBS was then removed and replaced with M154, and cells were incubated with test articles and/or vehicle controls for 16 hours in triplicate. Irradiation equipment was obtained from Solar Light Company, Glenside, PA and included Solar Simulator LS1000-6R-002 in Airmass 1.5 configuration using plain mirror; XPS1000 precision current source, and PMA2144 Pyranometer. Identical manipulations, with exception of presence of sunlight, were carried out with HEK serving as unstressed controls. After incubation, HEK cell supernatants were collected. Quantikine® ELISA kits (R&D Systems Inc, Minneapolis, MN) were used to quantify interleukins in the supernatants. IL-8 was quantified by Human CXCL/IL-8 Immunoassay kit (Catalog #D8000C). Percent (%) inhibition of IL-8 by the test articles were calculated by comparing to placebo treated controls from non-irradiated cells considered as 0% and from irradiated cells considered as 100%. LDH assay using Cytoscan™ LDH Assay kit (G-Biosciences Cat. No. 786-324) was performed on all HEK culture supernatants to make sure all tested concentrations had no cytotoxicity, and Kit-supplied lysis buffer was used as positive control.

Results

TABLE 3.1

Synergistic Effect of NN + CS (75% + 25%) Blend in Inhibition of IL-8 Induced by Full Sun Spectrum in Cultured Epidermal Keratinocytes

| Concentration | NN 75%* | CS 25%* | NN 75% + CS 25% Additive Effect* | NN + CS (75% + 25%) Synergistic Effect* |
|---|---|---|---|---|
| 0.004% | 41.1 | −5.2 | 36.0 | 50.0 |
| 0.01% | 54.7 | −6.0 | 48.7 | 68.9 |
| 0.04% | 56.6 | 2.6 | 59.2 | 88.7 |
| 0.1% | 48.2 | 17.8 | 66.1 | 86.6 |
| 0.4% | 49.6 | 36.8 | 86.4 | 119.8 |

*Results are calculated and expressed as average of % inhibition of IL-8 by test articles vs. vehicle controls.

Based on the identification of synergistic effect of the two blends in DPPH Free Radical Scavenging in Example 1 and mitigating surfactant-induced inflammatory cytokine in Example 2, further evaluation of these blends was conducted to assess their capability to inhibit full sun spectrum-induced inflammation in cultured HEK. As shown in Table 3.1, individual serum fraction of *Nelumbo nucifera* Gaertn. (Sacred Lotus, NN) and *Camellia sinensis* leaves (Tea Plant, CS), as well as their blend (NN+CS), were evaluated at five different concentrations according to the method described herein. Percent (%) inhibition of inflammatory chemokine IL-8 induced by full sun spectrum, versus placebo-treated and full sun spectrum-induced control, was determined for assessing anti-inflammatory and anti-aging activities of the test articles in HEK. The higher % inhibition indicates the more desired activities, thus positive anti-inflammatory and anti-aging benefits. Additive effect was derived from the sum of individual activities of NN 75% and CS 25% in inhibition of inflammatory chemokine IL-8 induced by full sun spectrum. Surprisingly, the blend of NN+CS (75%+25%) showed synergistic effect in all the test concentrations, as the % inhibition of IL-8 by the blend is higher than that of the sum of individual serum fractions.

TABLE 3.2

Synergistic Effect of NN + CR-F (75% + 25%) Blend in Inhibition of IL-8 Induced by Full Sun Spectrum in Cultured Epidermal Keratinocytes

| Concentration | NN 75%* | CR-F 25%* | NN 75% + CR-F 25% Additive Effect* | NN + CR-F (75% + 25%) Synergistic Effect* |
|---|---|---|---|---|
| 0.004% | 41.1 | −5.8 | 35.3 | 48.9 |
| 0.01% | 54.7 | −6.8 | 47.9 | 72.0 |
| 0.04% | 56.6 | −7.4 | 49.2 | 86.6 |
| 0.1% | 48.2 | −1.8 | 46.4 | 90.9 |
| 0.4% | 49.6 | 0.5 | 50.1 | 50.6 |

*Results are calculated and expressed as average of % inhibition of IL-8 by test articles vs. vehicle controls.

As shown in Table 3.2, individual serum fraction of *Nelumbo nucifera* Gaertn. (Sacred Lotus, NN) and *Chamomilla recutita* (German Chamomile (*Matricaria*) Flower, CR-F), as well as their blend (NN+CR-F), were evaluated at five different concentrations according to the method described herein. Percent (%) inhibition of inflammatory chemokine IL-8 induced by full sun spectrum, versus placebo-treated, full sun spectrum-induced control, was determined for assessing anti-inflammatory and anti-aging activities of the test articles in HEK. The higher % inhibition indicates the more desired activities, thus positive anti-inflammatory and anti-aging benefits. Additive effect was derived from the sum of individual activities of NN 75% and CR-F 25% in inhibition of inflammatory chemokine IL-8 induced by full sun spectrum. Surprisingly, the blend of NN+CR-F (75%+25%) showed synergistic effect in all the test concentrations, as the % inhibition of IL-8 by the blend is higher than that of the sum of individual serum fractions.

Example 4. Inhibition of Elastase Enzymatic Activity

Elastin is essential in connective tissues which depend on elasticity for their function, such as skin. Excessive elastase activity, commonly related to inflammation, degrades elastin in elastic fiber network and decreases strength and resilience of the skin. Elastin is one of the dermal extracellular matrix components, which is responsible for maintaining the elasticity and resilience of the skin [Oikarinen A. Connective tissue and aging. Int. J. Cosmet. Sci. 26:107-8, 2004]. It is an insoluble elastic fiber protein along with collagen in influencing the mechanical properties of connective tissue [Antonicelli F, Bellon G, Debelle L, Hornebeck W. Elastin-elastases and inflamm-aging. Curr Top Dev Biol. 79:99-155, 2007]. During aging, the elasticity of the skin is reduced by the enzyme elastase which degrades elastin fibers and leads to sagging. Elastase belongs to the family of chymotrypsin, an enzyme that is capable of hydrolyzing materials such as elastin and fibrillin. The secretion and activation of elastase from dermal fibroblasts in response to sun radiation and/or to inflammatory cytokines released by keratinocytes are responsible for the degeneration of the three-dimensional structure of elastic fibers during the formation of wrinkles in skin aging process.

Materials and Methods

Human neutrophil elastase inhibition by test articles was determined in kinetic colorimetric assay described by Elastin Products Company, Inc. [Elastin Products Company. Assay with N-MeO-Suc-Ala-Ala-Pro-Val-pNA (EPC No. FH237) as substrate. Elastin Products Company, Inc. Research Biochemicals Catalogue. p. 84, 2004] modified for its use with 96-well microtiter plates (Corning catalogue number 3641) from Corning, Inc. (Corning, NY, USA) and Synergy 2 microplate reader from BioTek Instruments, Inc. (Winooski, VT, USA). The N-Methoxysuccinyl-Ala-Ala-Pro-Val-pNA substrate (EPC catalogue number FH237), and elastase (EPC SE563) were from Elastin Products Company (Owensville, MI, USA). Working solution of elastase was prepared with 0.15 M (molar) pH 7.5 Tris-HCl buffer containing 50 mM (millimolar) NaCl. Working solution of substrate was prepared in 0.15 M pH 5.0 acetate buffer containing 100 mM NaCl, with an aliquot of 2 percent by volume of final buffer of 1-methyl-2-pyrrolidone used for initial dissolution of the substrate. Deionized water was used to dissolve buffer components. Reaction volume in each well was 224 µl (microliter); concentration of elastase was 0.87 units/ml, and substrate at 363 µM. Enzymatic activity in cleaving the substrate was indicated by a development of yellow color measured as increase in absorbance at 410 nm wavelength. The mean of maximum rate of absorbance increase in untreated wells was considered as 100 percent of enzyme activity. $IC_{50}$ was calculated, as concentration of test article in the well reducing the elastase activity to 50 percent, by sigmoidal curve fitting with SigmaPlot 10.0 (Systat Sofware).

Results

TABLE 4

Elastase inhibition of NN + CS (75% + 25%) and NN + CR-F (75% + 25%) Blends

| Inhibition of Enzymatic Activity | NN + CS (75% + 25%) | NN + CR-F (75% + 25%) |
|---|---|---|
| Neutrophil Elastase ($IC_{50}$) | 0.4% | 0.9% |

Elastase inhibition for enhancing elasticity of skin is calculated as $IC_{50}$, the concentration of a test article showing 50% inhibition of elastase. As shown in Table 4, the blend of serum fraction of *Nelumbo nucifera* Gaertn. (Sacred Lotus, NN) and *Camellia sinensis* (Tea Plant, CS) and the blend of serum fraction of *Nelumbo nucifera* Gaertn. (Sacred Lotus, NN) and *Chamomilla recutita* (German Chamomile (*Matricaria*) Flower, CR-F) were tested. The data indicate that NN+CS (75%+25%) and NN+CR-F (75%+25%) blends demonstrate $IC_{50}$ 0.4% and 0.9%, respectively.

Example 5: Inhibition of 5-Lipoxygenase (5-LOX) and Cyclooxygenase-2 (COX-2) Enzymatic Activities The mediators arising from the cyclooxygenase (COX) cascade and the role of biologically active prostaglandins (PG) in the inflammatory process and body homoeostasis have been extensively studied. In addition, the complex pathway of arachidonic acid metabolism in inflammation involves a variety of mediators other than the COX, all of which have a role in the overall process. Leukotrienes (LT), which are the second main family of arachidonic acid derivatives, are synthesized from the activity of 5-lipoxygenase (5-LOX) and have a major role in the inflammatory process. 5-LOX catalyzes the oxidative metabolism of arachidonic acid to 5-hydroxyeicosatetraenoic acid (5-HETE), the initial reaction leading to formation of leukotrienes. LTs are inflammatory mediators causing, for example, phagocyte chemotaxis and increased vascular permeability. Inhibition of LT biosynthesis may be beneficial in inflammatory skin diseases and skin aging. COX is a rate-limiting enzyme in prostanoid biosynthesis. PGs, including the prostaglandins, prostacyclin and thromboxane, are lipid signaling molecules that regulate numerous physio-logical processes in skin such as normal physiology, cutaneous inflammation, nociception, wound healing, and tumorigenesis [J L. Lee, H. Mukhtar, D R. Bickersa L. Kopelovich, M. Athar. Cyclooxygenases in the skin: pharmacological and toxicological implications. Tox Appl Pharm. 192 (3)1294-306, 2003]. COX-2 mediates inflammatory processes in skin, including inflammatory hyperalgesia and nociception, and administration of specific COX-2 inhibitors reduces edema, vascular permeability, and other markers of cutaneous inflammation resulting in skin aging. It has been found that dual 5-LOX/COX inhibitors are potential new drugs to treat inflammation. They act by blocking the formation of both PGs and LTs [J. Martel-Pelletier, D. Lajeunesse, P. Reboul, J-P. Pelletier. Therapeutic role of dual inhibitors of 5-LOX and COX, selective and non-selective non-steroidal anti-inflammatory drugs. Ann Rheum Dis 62:501-509, 2003].

Materials and Methods

Assay of 5-LOX was performed as follow. Test articles in duplicate and dye DHR123 were preincubated with 10 U/ml of enzyme for 5 minutes at 25° C. in Tris buffer pH 7.4. The reaction was initiated by addition of 25 μM arachidonic acid for another 20 minutes incubation period. Human recombinant 5-LOX expressed in insect Sf9 cells was used. Nordihydroguaiaretic acid (NDGA), an antagonist of 5-LOX, served as a reference compound. Read plate on a spectrophotometer with excitation at 485 nm, and emission at 535 nm.

Assay of COX-2 was performed as follow. Human recombinant cyclooxygenase-2 expressed in insect Sf21 cells was used. Test article and/or vehicle in duplicate was preincubated with 1.3 U/ml enzyme‡ in modified Tris-HCl buffer pH 7.7 for 15 minutes at 37° C. The reaction was initiated by addition of 0.3 μM arachidonic acid for another 5 minutes incubation period and terminated by further addition of 1 N HCl. An aliquot was removed for determination of the amount of PGE2 formed spectrophotometrically by EIA kit.

Results

TABLE 5

Inhibition of 5-Lipoxygenase (5-LOX) and Cyclooxygenase-2 (COX-2) by NN + CS (75% + 25%) and NN + CR-F (75% + 25%) Blends

| | % Inhibition (at 0.5% of Test Article) | |
|---|---|---|
| | NN + CS (75% + 25%) | NN + CR-F (75% + 25%) |
| 5-Lipoxygenase (5-LOX) | 57 | 60 |
| Cyclooxygenase-2 (COX-2) | 99 | ND* |

ND*—Not Detected Activity

Inhibition of 5-LOX and COX-2 for anti-inflammatory and anti-aging activities are calculated as % inhibition of both enzymatic activities by test articles at 0.5% of concentration. For reference, nordihydroguaiaretic acid (NDGA), a natural dicatechol and a non-cytotoxic antagonist of 5-LOX, shows $IC_{50}$ 0.32 μM. Control inhibitor for COX-2, rofecoxib, shows $IC_{50}$ 0.17 μM. As shown in Table 5, the blend of serum fraction of *Nelumbo nucifera* Gaertn. (Sacred Lotus, NN) and *Camellia sinensis* leaves (Tea Plant, CS) and the blend of serum fraction of *Nelumbo nucifera* Gaertn. (Sacred Lotus, NN) and *Chamomilla recutita* (German Chamomile (*Matricaria*) Flower, CR-F) were tested. The data indicate that NN+CS (75%+25%) blend at 0.5% demonstrate inhibition of 5-LOX and Cox-2 57% and 99%, respectively. However, NN+CR-F (75%+25%) blend shows only inhibiting 5-LOX 60% but no inhibition of Cox-2 at the test concentration of 0.5%.

Example 6: Inhibition of Matrix Metalloproteinases (MMPs)

The MMP family shares significant sequence homology and a common multidomain structure. On the basis of their preferred substrates, they can be divided into four main classes: collagenases, gelatinases, stromelysins and membrane-type MMPs. These enzymes demonstrate very low activity in normal tissue but are upregulated and/or activated during skin inflammation and physiological remodeling processes in response to specific stimuli, including cytokines, growth factors and extracellular matrix interactions. Studies have shown that solar, especially UV radiation elevates at least three different MMPs in human skin in vivo, i.e., interstitial collagenase (MMP-1), stromelysin-1 (MMP-3), and gelatinase (MMP-9) [Fisher G, Kang S, Varani J, Bata-Csorgo Z, Wan Y, Datta S, et al. Mechanisms of photoaging and chronological skin aging. Arch Dermatol. 138:1462-1470, 2002; Quan T, Qin Z, Xia W, Shao Y, Voorhees J, Fisher G. Matrix-Degrading Metalloproteinases in Photoaging, J Invest Derm Symp Proc. 14 (1):20-24, 2009]. The combined actions of MMP-1, 3, and 9 have the capacity to degrade most of the proteins that comprise the dermal extracellular matrix, which play critical roles in cutaneous inflammation and skin aging.

Materials and Methods

Human recombinant MMP proenzymes are activated with APMA for 60 minutes at 37° C. Test article and/or vehicle in duplicate is preincubated with 0.4, 5, and 8 nM active enzyme of MMP-9, -3, and -1 in modified MOPS buffer pH 7.2 for 60 minutes at 37° C. The reaction is initiated by addition of 4 mM Mca-Pro-Leu-Gly-Leu-Dap-Ala-Arg for another 120 minutes incubation period. TIMP-2 (Tissue Inhibitor of Metalloproteinases 2), a natural inhibitor of MMPs, was used as a reference compound. Determination of the amount of Mca-Pro-Leu-Gly formed was read spectrofluorimetrically at 340 nm/400 nm.

Results

TABLE 6

Inhibition of Matrix Metalloproteinase)-1, 3, and 9 (MMP) by NN + CS (75% + 25%) and NN + CR-F (75% + 25%) Blends

| | % Inhibition (at 0.5% of Test Article) | |
|---|---|---|
| | NN + CS (75% + 25%) | NN + CR-F (75% + 25%) |
| Matrix Metalloproteinase-1 (MMP-1) | 21 | 10 |
| Matrix Metalloproteinase-3 (MMP-3) | 22 | 19 |
| Matrix Metalloproteinase-9 (MMP-9) | 20 | 20 |

Inhibition of MMP-1, 3, and 9 for anti-aging and anti-inflammatory activities such as slowing down skin dermal matrix degradation are calculated as % inhibition of the enzymatic activities by test articles at 0.5% of concentration. For reference, TIMP-2 (Tissue Inhibitor of Metalloproteinases 2), a natural inhibitor of MMPs as a positive control, shows $IC_{50}$ 7.84 nM. As shown in Table 6, the blend of serum fraction of *Nelumbo nucifera* Gaertn. (Sacred Lotus, NN) and *Camellia sinensis* leaves (Tea Plant, CS) and the blend of serum fraction of *Nelumbo nucifera* Gaertn. (Sacred Lotus, NN) and *Chamomilla recutita* (German Chamomile (*Matricaria*) Flower, CR-F) were tested. The data indicate that NN+CS (75%+25%) blend at 0.5% demonstrate inhibition of MMP-1, 3, and 9 around 20%. In addition, NN+CR-F (75%+25%) blend shows similar level of inhibiting MMP-3 and 9 as the NN+CS (75%+25%) blend; and lower level (10%) of inhibiting MMP-1.

Example 7: Photostability Test Under Full Sun Spectrum Irradiation

Critical Wavelength (CW), nm was determined according to FDA, Final Rule 2011. Absorbance of a 0.75 mg/square cm film is measured between 290 nm and 400 nm, after 4 MED pre-irradiation. CW defined as the wavelength at which the integral of the spectral absorbance curve reaches 90% of the integral from 290 to 400 nm.

Materials and Methods Absorbance spectra and photostability evaluations of individual serum fraction of *Nelumbo* nucifera Gaertn. (Sacred Lotus, NN), *Camellia sinensis* leaves (Tea Plant, CS), and *Chamomilla recutita* (German Chamomile (*Matricaria*) Flower, CR-F), as well as their blends NN+CS (75%+25%) and NN+CR-F (75%+25%) were in 5% v/v dilutions by deionized water immediately prior to testing. Seventy microliter aliquots (amount sufficient for forming a meniscus in the test setup) of these dilutions, as well as deionized water as a blank, were placed in wells of a quartz 96-well microtiter plate (clear bottom, black sides, obtained from Hellma Analytics). The plate was covered with 1-millimeter thick quartz sheet. The covered plate was placed on white underlay atop Peltier-cooled surface (Torrey Pines Scientific heating/chilling dry bath/shaker with microplate holder attachment). Peltier cooling was set to 15 degrees Celsius. Plate holder temperature was 18° C. The plate was irradiated using a solar simulator (LS-1000 from SolarLight) with filter and mirror configuration corresponding to airmass 1.5. Prior to irradiation of the samples, time corresponding to 1 Minimal Erythemal Dose (MED) for solar simulator light passing through the 1-millimeter quartz sheet was measured using a datalogging radiometer with erythema detector (PMA2100 and 2101 respectively, both from SolarLight). The quartz plate with samples was irradiated for total exposures corresponding to 1, 4, and 8 MEDs 1 MED was 14 min 25 seconds for this test. Top of plate reached maximum of about 36° C. during irradiation. Absorbance spectra of the microtiter plate contents at wavelengths from 280 nanometers to 500 nanometers were obtained using BioTek Synergy 2 microplate reader before irradiation, as well as after 1, 4, and 8 MED total exposures. Resulting absorbance curves of wells with deionized water were subtracted from absorbance curves for the diluted serum fractions. These blank-subtracted curves were then normalized for clearer qualitative comparison of shapes and proportions. The normalization was a rescaling which considered the maximum absorbance of a curve as 1, and minimum absorbance of a curve as 0. The different nature of these decreases is clearly shown by normalized absorbance curves.

Results

UVA/UVB Ratios of individual serum fraction of *Nelumbo nucifera* Gaertn. (Sacred Lotus, NN), *Camellia sinensis* leaves (Tea Plant, CS), and *Chamomilla recutita* (German Chamomile (*Matricaria*) Flower, CR-F), as well as their blends NN+CS (75%+25%) and NN+CR-F (75%+25%) were determined based on the normalized absorbance curves measured between 290 nm and 400 nm before and after irradiation. The ratio of areas under the curve between 290-320 (UVB region) was compared with the area under the curve between 320 nm and 400 nm (UVA region). UVA/UVB ratio is the parameter of choice used by the industry to determine the protection potential and photostability of various ingredients, sunscreen actives and finished goods.

TABLE 7

UVA/UVB Ratios Derived from Absorbance Spectra of the Individual Serum Fractions and Their Blends Before and After Irradiation by Full Spectrum Simulated Sunlight

| Test Article | Dose of Full Spectrum Simulated Sunlight | | | |
|---|---|---|---|---|
| (5% v/v in DI water) | 0 MED | 1 MED | 4 MED | 8 MED |
| *Nelumbo nucifera* (NN) | 1.83 | 1.88 | 1.93 | 1.97 |
| *Camellia sinensis* (CS) | 0.98 | 1.00 | 0.99 | 0.99 |

TABLE 7-continued

UVA/UVB Ratios Derived from Absorbance Spectra of the Individual Serum Fractions and Their Blends Before and After Irradiation by Full Spectrum Simulated Sunlight

| Test Article | Dose of Full Spectrum Simulated Sunlight | | | |
|---|---|---|---|---|
| (5% v/v in DI water) | 0 MED | 1 MED | 4 MED | 8 MED |
| *Chamomilla recutita* Flower (CR-F) | 0.96 | 0.95 | 0.91 | 0.90 |
| NN + CS (75% + 25%) Blend | 1.66 | 1.70 | 1.74 | 1.74 |
| NN + CR-F (75% + 25%) Blend | 1.70 | 1.73 | 1.74 | 1.74 |

MED: Minimal Erythemal Dose. Data are presented as UVA/UVB ratios derived from absorbance spectra of the test articles.

As shown in Table 7, individual serum fraction of *Nelumbo nucifera* Gaertn. (Sacred Lotus, NN) and *Camellia sinensis* leaves (Tea Plant, CS), as well as their blend NN+CS (75%+25%) after irradiation by full spectrum simulated sunlight demonstrated increase in UVA/UVB Ratios derived from the normalized absorbance spectra. It was found that the increasing exposure to simulated full spectrum sunlight causes proportionally higher attenuation from about 320 nm to about 380 nm wavelengths, with most notable difference being the peak at about 350 nanometers. Beneficial changes in UVA/UVB ratios after irradiation correspond mainly to the increase of the absorbance in UVA (320 nm-400 nm) region.

Although there is a decrease in UVA/UVB ratios after irradiation corresponding to the normalized absorbance spectra of *Chamomilla recutita* (German Chamomile (*Matricaria*) Flower, CR-F), the blend of NN+CR-F (75%+25%) surprisingly demonstrates increase in UVA/UVB Ratios based on normalized absorbance spectra. It was found that the increasing exposure of the NN+CR-F (75%+25%) blend to simulated full spectrum sunlight causes proportionally higher attenuation from about 300 nm to about 380 nm wavelengths, suggesting beneficial changes in UVA/UVB ratios after irradiation correspond mainly to the increase of the absorbance in both UVB (280 nm-320 nm) and UVA (320 nm-400 nm) regions.

It was unexpectedly found that NN+CS (75%+25%) and NN+CR-F (75%+25%) each has synergistic combinations of: beneficial spectral absorbance characteristics in UVA-UVB area in conjunction with potent biological activities demonstrated in vitro cell culture-based bioassay associated with full spectrum sun exposure and relevant enzymatic models.

Example 8: Day Cream Composition Acne Wipe Juice Formulation

TABLE 8

| Phase | Raw Material | Formula % (w/w) |
|---|---|---|
| A | Water | 2.00-70.00 |
| | Glycerin | 0.5-5.00 |
| | A.H.A. Multifruit BSC | 0.1-1.00 |
| B | NAB Willow Bark Extract | 0.012-10.00 |
| | SD Alcohol 40B 190 Proof | 0.01-10.00 |
| | Witch Hazel 14% Alcohol | 1.00-10.00 |
| C | Polyglyceryl-4 Caprate | 0.1-1.00 |
| | Phenoxyethanol | 0.01-0.75 |
| | NN + CS Synergistic Blend (75 + 25) | 0.1-0.66 |
| | Total | 0.000 |

Example 9: Night Cream Composition Pearl Cleanser Formulation

TABLE 9

| Phase | Part # Raw Material | Raw Material Formula % (w/w) |
|---|---|---|
| A | | |
| B | Deionized water | 1.00-50.00 |
| | Glycerine | 1.00-100.00 |
| | Stearic Acid | 1.0-100 |
| | Glyceryl Stearate Citrate | 0.010-4.00 |
| | Dermofeel G2L | 0.001-1000 |
| | Phenoxyethanol | 0.001-1.00 |
| | Montanov 82 | 0.1-100 |
| | jojoba Wax | 0.05-2.00 |
| | Shea Butter | 0.01-1.00 |
| | Sodium Cocoyl Glycimate | 1.0-10.0 |
| | Coconut Oil | 0.1-1.00 |
| | Cetyl Alcohol | 1.0-3.00 |
| C | Potassium hydroxide | 1.0-4.00 |
| | NN + CR-F Synergistic Blend (75 + 25) | 0.5-0.66 |

Example 10: Night Cream Composition Natural Cream Formulation

TABLE 10

| Trade Name | Formula % (w/w) |
|---|---|
| Water | 20-80 |
| Sodium Phytate water and Alcohol Glycerin | 0.01-0.1 |
| Ecogel | 0.1-50 |
| Myritol 312 | 0.1-20 |
| Red Raspberry Seed Oil (412650) | 0.1-50 |
| Cetiol C5 (NPA approved) | 1.0-2.0 |
| Willow Bark Extract | 0.4-2.0 |
| Oleyl Erucate | 3.00 |
| NN + CR-F Synergistic Blend (75 + 25) | 0.5- |
| Decyl Oleate | 1.0-3.0 |
| Dipotassium Glycyrrhizate | 0.01-0.1 |
| Coviox T-70 | 0.01-0.1 |
| CE-140519 Petal and Dew Drops 100% Natural | 0.01-0.5 |

Example 11: Night Cream Composition—Tint Moisturizer Formulation

TABLE 11

| Trade Name | Formula % (w/w) |
|---|---|
| Water | 20-80 |
| Sodium Phytate water and Alcohol Glycerin | 0.01-0.1 |
| Ecogel | 0.1-50 |
| Myritol 312 | 0.1-20 |
| Red Raspberry Seed Oil (412650) | 0.1-50 |
| Cetiol C5 (NPA approved) | 1.0-2.0 |
| Oleyl Erucate | 3.00 |
| NN + CR-F (75 + 25) Synergistic Blend | 0.5-2.00 |
| Decyl Oleate | 1.0-3.0 |
| Dipotassium Glycyrrhizate | 0.01-0.1 |
| Coviox T-70 | 0.01-0.1 |

TABLE 11-continued

| Trade Name | Formula % (w/w) |
|---|---|
| CE-140519 Petal and Dew Drops 100% Natural | 0.01-0.5 |
| Red Iron Oxide | 0.01-3.00 |
| Yellow Iron Oxide | 0.01-3.00 |
| Black Iron Oxide | 0.01-3.00 |
| TiO2 | 0.01-3.00 |

Example 12: Repeated Insult Patch Test (RIPT)

Objective

The objective of this study was to determine the potential of test materials to elicit dermal irritation and/or induce sensitization following repeated patch applications.

Test Material

The following test material was used for skin irritation and allergenicity testing.

TABLE 12

| Test Material | Test Condition | Patch Type | Number of subjects |
|---|---|---|---|
| Microbiome Mister RD91-40 | Neat | Occlusive | 53 |
| Tinted Moisturizer Light Composite: Ivory 2010 RD96-015-111318 RD96-30, Buff 2015 RD96-016-111318 RD96-31, Natural Beige 2025 RD96-017-111318 RD96-32 and Almond Beige 2020 RD96-018-111318 RD96-36 | Neat | Occlusive | 56 |
| Tinted Moisturizer Dark Composite: Honey 2040 RD96-019-111318 RD96-33, Warm Honey 2045 RD96-020-111318 RD96-34, Pecan 2055 RD96-021-111318 RD96-37 and Chestnut 2060 RD96-022-111318 RD96-35 | Neat | Occlusive | 56 |

TABLE 13

Formula of Microbiome Mister (RD91-40)

| Ingredient | % (w/w) |
|---|---|
| RM Deionized Water | 0.01-90 |
| RM Glycerin 99.7%, USP | 0.10-1.5 |
| RM Ajidew NL-50 | 0.02-5 |
| RM Poly SugaMulse D9 | 0.01-0.5 |
| RM Microcare SB | 0.01-2.0 |
| RM Witch Hazel 14% Alcohol Ntrl | 0.1-15 |
| RM Frag Herbal Leaf & Davana Zing CE-199619 | 0.05-0.1 |
| RM NN + CS (75 + 25) Synergistic Blend | 0.7-1.00 |
| RM Glycofilm 1.5P | 0.1-5.0 |
| RM Xanthan Gum Fine | 0.10-0.15 |
| RM Phenoxyethanol | 0.01-0.5 |

TABLE 14

Formula of Tinted Moisturizer Composite RD96-015-111318

| Trade Name | INCI | Ivory F#272111.001 RD96-015-111318 |
|---|---|---|
| RM Deionized Water | Water | 50.505% |
| RM Potassium Sorbate | Potassium Sorbate | 0.150% |
| RM Dermofeel PA-3 | Sodium Phytate (and) Water (and) Alcohol | 0.20% |
| RM Xanthan Gum Fine | Xanthan Gum | 0.25% |
| RM Vegetable Glycerin | Glycerin | 3.500% |
| RM Sunflower Oil | *Helianthus annuus* (sunflower) seed oil | 4.000% |
| RM Acai Oil | *Helianthus annuus* (sunflower) seed oil (and) *Euterpe oleracea* fruit oil (and) tocopherol | 1.00000% |
| RM Coconut Oil | *Cocos nucifera* (coconut) oil | 1.0000% |
| RM Lexfeel Natural | Heptyl Undecylenate | 5.00% |
| RM Cetiol Ultimate | Undecane (and) tridecane (and) tocpherol | 7.000% |
| RM Neossance Squalane | Squalane | 3.000% |
| RM Stearyl Alcohol Wax | Stearyl Alcohol | 1.700% |
| RM Cetearyl Alcohol (Lanette O) | Cetearyl Alcohol | 0.730% |
| RM Glyceryl Stearate SE Wax | Glyceryl Stearate (and) potassium stearate | 6.360% |
| RM Emulmetik 300 | Lecithin | 0.380% |
| RM BWX Pastilles CMMNTY SRCD 486P | beeswax | 0.660% |
| RM Polyglyceryl-3 Stearate | Polyglyceryl-3 Stearate | 0.660% |
| RM Phenoxyethanol | Phenoxyethanol | 0.950% |
| RM Dermofeel Sensolv | Isoamyl Laurate | 3.600% |
| RM Tegosoft PC 41 | Water (and) Polyglyceryl-4 Caprate | 3.000% |
| RM OD75CJE | Titanium Dioxide (and) octyldodecanol (and) jojoba esters (and) trihydroxystearin (and) alumina (and) silica | 4.530% |
| RM OD55YJE | Iron Oxides (CI 77492) (and) jojoba esters (and) octyldodecanol (and) trihydroxystearin | 0.580% |
| RM OD75RJE | Iron Oxides (CI 77491) (and) octyldodecanol (and) jojoba esters (and) trihydroxystearin | 0.110% |
| RM OD75BJE | Iron Oxides (CI 77499) (and) Octyldodecanol (and) jojoba esters (and) trihydroxystearin | 0.035% |
| PhytoFusion of Lotus and Camellia Extract NN + CS | *Nelumbo Nucifera* Extract (and) *Camellia Sinensis* Leaf Extract (and) Potassium sorbate (and) Sodium Benzoate (and) Ascorbic Acid (and) Sodium Phytate | 1.000% |
| Aloe & Cucumber Water CE-198753 | Fragrance | 0.100% |
| Total | | 100.00% |

Subject Selection

Healthy, male and female subjects, ranging in age from 19 to 70 years were selected for the study. Subjects who met all of the inclusion criteria and none of the exclusion criteria listed in the study protocol were enrolled for participation.

Inclusion Criteria
 a. Subject is male or female between the ages of 18 and 70 years;
 b. Female subjects who are sexually active are using adequate method of birth control;
 c. Subject does not exhibit any skin diseases which might be confused with a skin reaction from the test material;
 d. Subject agrees to avoid exposure of the test sites to the sun and to refrain from visits to tanning salons during the course of this study;
 e. Subject agrees to refrain from getting patches wet and from scrubbing or washing the test area with soap or applying powder, lotions or personal care products to the area during the course of the study;
 f. Subject has signed an Informed Consent in conformance with 21CFR Part 50: "Protection of Human Subjects;"
 g. Subject has completed a HIPAA Authorization Form in conformance with 45CFR Parts 160 and 164;
 h. Subject is in generally good health and has a current Subject Profile on file;
 i. Subject is dependable and able to follow directions as outlined in the protocol.

Exclusion Criteria
 a. Subject is pregnant, nursing, or planning to become pregnant, or not using adequate birth control;
 b. Subject is currently using any systemic or topical corticosteroids, anti-inflammatory drugs, or antihistamines on a regular basis;
 c. Subject reports allergies to cosmetics, toiletries, or personal care products;
 d. Subject exhibits any skin disorders, sunburn, scars, excessive tattoos, etc. in the test area;
 e. Subject has scheduled, or is planning to undergo, any medical or surgical procedures during the 6-week course of the study.

Study Evaluations

TABLE 15

Dermal coding System

| Dermal | |
|---|---|
| 0 | No visible skin reaction |
| + | Barely perceptible erythema |

TABLE 15-continued

Dermal coding System

| Score | Description |
|---|---|
| 1+ | Mild erythema |
| 2+ | Well defined erythema |
| 3+ | Severe erythema and edema |
| 4+ | Erythema and edema with vesiculation |

Letter Codes

| | |
|---|---|
| e = | Edema |
| | No visible skin reaction |
| P = | Peeling |
| S = | Spreading of reaction beyond patch site. |
| Sc = | Scabbing |
| d = | Dryness/scaling |
| D = | Oozing, crusting, and/or superficial erosions |
| I = | Itching |
| F = | Follicular irritation with or without pustule formation (folliculitis) |
| Hr = | Hyperpigmentation |
| Ho = | Hypopigmentation |
| X = | Subject Absent |
| NP = | No patching |
| Pa = | Papules |
| C = | Changed site |
| — = | No reading |

Test Method Summary

Subject Identification

All subjects were initially identified by a permanent identification number. Subjects who met the qualification criteria were assigned a study subject number. This subject number was assigned in sequence as subjects were enrolled in the study. A master roster was kept of the permanent identification number and the corresponding study subject number.

Induction Phase

Informed Consent was obtained, Inclusion/Exclusion criteria, verified and qualified subjects were enrolled. The test site was cleansed with 70% isopropyl alcohol. The test material was applied to the upper back, between the scapulae and the waist, to either side of the spinal midline. The test material was applied to the same site three times each week, usually Monday, Wednesday, and Friday, for a total of nine applications. However, the schedule may have been modified to accommodate inclement weather, holidays, or missed applications. At the discretion of the Principal Investigator, the test material may have been applied on two consecutive days during the Induction Phase or a makeup day may have been added at the end of the Induction Phase.

The test product was applied nine times over the approximate three-week induction phase. Subjects had no fewer than eight subsequent evaluations unless requested by the Sponsor.

The test site was marked with a gentian violet surgical marker to ensure the continuity of patch application. The subjects were instructed to remove the patch after 24 hours of exposure. An evaluation of the site was made just prior to the application of the next patch for signs of dermal reactions, according to the scoring scale listed in Section 7.0.

Rest periods consisted of 24 hours following Tuesday and Thursday patch removal and 48 hours following the Saturday patch removal, except when the schedule was modified as described above.

If at any time during the Induction Phase of the study, a test material elicited a score of 2+ or greater, the application of that test material was moved to an adjacent virgin site. At the discretion of the Principal Investigator or designee, a test material eliciting a score less than a 2+ may have been moved to an adjacent site. The site may also have been changed if the subject exhibited abrasion, maceration of the skin or tape reaction around the site.

If a 2+ reaction or greater occurred on the changed site, the application of the test material may have been discontinued for the remainder of the Induction Phase but may have been challenged on the appropriate day of the study.

At the discretion of the Principal Investigator or designee, subjects exhibiting a significant reaction at the beginning of the Induction Phase may have been considered "pre-sensitized" to an ingredient(s) of the test product and may have been discontinued from the patching of that test material for the remainder of the study.

Challenge Phase

Approximately 10 to 21 days after the Induction Phase, a challenge patch was applied to a virgin site on the lower back, following the same procedure described for the Induction Phase. After 24 hours, the patch was removed by a study technician and the site was evaluated for dermal irritation.

Additional dermal evaluations were performed 48 and 72 hours after application. If a reaction with a dermal score of greater than "±" persists at the 72-hour reading, the site may have been evaluated at 96 hours. A site exhibiting a dermal score of "±" or greater for the first time at the 72-hour reading was evaluated at 96 hours when possible.

If a subject missed a visit during the Challenge Phase, he/she was asked to return to the laboratory for a 96-hour reading to ensure three data points were collected. Subjects having only 2 challenge phase data points may have been included in the analysis if the final visit was at the 72 or 96-hour time point. Dermal Irritation was graded using the scoring scale listed in Section 7.0.

REFERENCES

Draize, J. H. (1959). Dermal toxicity. Appraisal of the safety of chemicals in foods, drugs and cosmetics, 46-59.

Shelanski, H. A., & Shelanski, M. V. (1953, May). A new technique of human patch tests. In Proceedings of the Scientific Section of the Toilet Goods Association (Vol. 19, No. 46, pp. 4-7).

Study Results for Microbiome Mister RD91-40

Completed and Discontinued Subjects

This study was initiated with 58 subjects. Four subjects discontinued study participation for reasons unrelated to the test material and one subject was discontinued due to an adverse event (Section 9.3). A total of 53 subjects completed the study.

Dermal Evaluations

Individual dermal scores were recorded during the Induction and Challenge Phases.

Adverse Events

The following adverse events occurred during this study.

Subject #59 presented with mild erythema, diffuse and consistent to areas where tape was present. This was indicative of a tape allergy. Subject was discontinued. The adverse event was not related to the test material.

Subject #83 reported hitting her back into an object, resulting in a quarter sized hematoma that was observed in the patch site. The patch site was changed and the subject continued on the study. This adverse event was not related to the test material.

Subject #91 presented with erythema and edema consistent with tape adhesive sensitivity on the patch area on the final day of the study. This adverse event was not related to the test material.

Conclusion

Based on the test population of 53 subjects and under the conditions of this study, the test material identified as Microbiome Mister RD91-40 did not demonstrate a potential for eliciting dermal irritation or inducing sensitization.

Study Results for Tinted Moisturizer Light Composite

Completed and Discontinued Subjects

This study was initiated with 60 subjects. Four subjects discontinued study participation for reasons unrelated to the test material. A total of 56 subjects completed the study.

Dermal Evaluations

Individual dermal scores were recorded during the Induction and Challenge Phases.

Adverse Events

No adverse events were reported during the study.

Conclusion

Based on the test population of 56 subjects and under the conditions of this study, the test material identified as Tinted Moisturizer Light Composite: Ivory 2010 RD96-015-111318 RD96-30, Buff 2015 RD96-016-111318 RD96-31, Natural Beige 2025 RD96-017-111318 RD96-32 and Almond Beige 2020 RD96-018-111318 RD96-36 did not demonstrate a potential for eliciting dermal irritation or inducing sensitization.

Study Results for Tinted Moisturizer Dark Composite

Completed and Discontinued Subjects

This study was initiated with 60 subjects. Four subjects discontinued study participation for reasons unrelated to the test material. A total of 56 subjects completed the study.

Dermal Evaluations

Individual dermal scores were recorded during the Induction and Challenge Phases.

Adverse Events

No adverse events were reported during the study.

Conclusion

Based on the test population of 56 subjects and under the conditions of this study, the test material identified as Tinted Moisturizer Dark Composite: Honey 2040 RD96-019-111318 RD96-33, Warm Honey 2045 RD96-020-111318 RD96-34, Pecan 2055 RD96-021-111318 RD96-37 and Chestnut 2060 RD96-022-111318 RD96-35 did not demonstrate a potential for eliciting dermal irritation or inducing sensitization.

The invention claimed is:

1. A skin care composition comprising (1) a physiologically acceptable medium and (2) from 0.01 % to 2 % by weight of the final skin care composition of a composition consisting of: a blend of a *Nelumbo nucifera* (Sacred Lotus, NN) serum fraction and a *Camellia sinensis* leaves (Tea plant, CS) serum fraction in a respective weight ratio of 75:25, wherein each said serum fraction is isolated using a fractionation process comprising the following steps: subjecting the fresh plant biomass to maceration pressing and filtering to yield fiber-enriched material (Cell Wall Fraction) and Intercellular Colloidal Dispersion (ICD), exposing said ICD to isoelectric treatment followed by electromagnetic waves treatment at a frequency of between 2.45 GHz and 7.0 GHz to trigger its destabilization (Treatment 1), subjecting the destabilized ICD to centrifugation to yield a precipitated Membrane Fraction and a Cytoplasm/Cytosol Fraction, subjecting the Cytoplasm/Cytosol Fraction to isoelectric treatment and centrifugation (Treatment 2) to yield a precipitated Cytoplasm Fraction and a Cytosol Fraction, then refining the Cytosol Fraction to yield a Serum Fraction (Treatment 3).

2. The skin care composition of claim 1, wherein the skin care composition is a topical composition.

3. The skin care composition of claim 1, wherein the topical composition is selected from the group consisting of an aqueous, hydro-alcoholic or oily solution; and oil-in water emulsion, a water-in-oil emulsion or multiple emulsions; a suspension or a powder.

4. The skin care composition of claim 1, further comprising cosmetic excipients to prepare a day cream composition.

5. The skin care composition of claim 1, further comprising an emulsifier blend comprising sucrose ester blend, alkylaryl glucoside, alkylaryl alcohol and fatty alcohol at a concentration from about 3% to about 20% of the composition by weight, from about 5% to about 15% of the composition by weight, or from about 8% to about 10% of the composition by weight.

6. The skin care composition of claim 5, wherein said sucrose ester blend is selected from the group consisting of sugar ester, glycerin, and caprylic/capric triglyceride, and combination thereof.

7. The skin care composition of claim 5, wherein the alkyl chain of said alkylaryl glucoside comprises of from 4 to 30 carbon atoms, from 6 to 20 carbon atoms, or from 12 to 18 carbon atoms.

8. The skin care composition of claim 5, wherein the alkyl chain of the alkylaryl alcohol comprises of from 4 to 30 carbon atoms, from 6 to 20 carbon atoms, or from 12 to 18 carbon atoms.

9. The skin care composition of claim 5, wherein the fatty alcohol comprises of from 4 to 30 carbon atoms, from 6 to 20 carbon atoms, or from 12 to 18 carbon atoms.

10. A method for improving skin appearance associated with skin aging comprising the step of applying the skin care composition of claim 1 to facial or body skin surface.

11. The method of claim 10 to improve skin hydration, skin barrier function, skin laxity, appearance of skin wrinkles, skin pigmentation and/or skin tone.

12. The method of claim 10 to mitigate adverse effects caused by full spectrum sunlight, UV radiations and surfactants.

13. The method of claim 10 to inhibit IL-1α release induced by SDS and to inhibit IL-8 release induced by full sun spectrum irradiation.

* * * * *